(12) United States Patent
Takada et al.

(10) Patent No.: US 11,498,222 B2
(45) Date of Patent: Nov. 15, 2022

(54) AUTONOMOUSLY ACTING ROBOT THAT STARES AT COMPANION

(71) Applicant: GROOVE X, Inc., Tokyo (JP)

(72) Inventors: Yuuki Takada, Tokyo (JP); Takuma Miyamoto, Tokyo (JP); Kaname Hayashi, Tokyo (JP); Shunsuke Otsubo, Tokyo (JP); Hiroki Nakazato, Tokyo (JP); Naoto Yoshioka, Tokyo (JP); Masahiro Emoto, Tokyo (JP)

(73) Assignee: GROOVE X, INC., Tokyo (JP)

( * ) Notice: Subject to any disclaimer, the term of this patent is extended or adjusted under 35 U.S.C. 154(b) by 276 days.

(21) Appl. No.: 16/814,977

(22) Filed: Mar. 10, 2020

(65) Prior Publication Data

US 2020/0206940 A1 Jul. 2, 2020

Related U.S. Application Data

(63) Continuation of application No. PCT/JP2018/033466, filed on Sep. 10, 2018.

(30) Foreign Application Priority Data

Sep. 11, 2017 (JP) .............................. JP2017-173975

(51) Int. Cl.
*B25J 11/00* (2006.01)
*B25J 9/16* (2006.01)
(Continued)

(52) U.S. Cl.
CPC ........... *B25J 11/0015* (2013.01); *B25J 9/161* (2013.01); *B25J 9/1679* (2013.01); *B25J 9/1694* (2013.01); *B25J 13/086* (2013.01); *B25J 19/04* (2013.01)

(58) Field of Classification Search
CPC ........ B25J 19/04; B25J 11/0005; B25J 13/00; B25J 11/0015; B25J 9/161; B25J 9/1679;
(Continued)

(56) References Cited

U.S. PATENT DOCUMENTS 6,415,203 B1 * 7/2002 Inoue ................... B25J 19/0054
701/79
6,505,098 B1 * 1/2003 Sakamoto ................ A63H 3/52
700/215
(Continued)

FOREIGN PATENT DOCUMENTS

CN 101143264 A 3/2008
DE 112017005954 T5 9/2019
(Continued)

OTHER PUBLICATIONS

International Search Report in PCT/JP2018/033466, dated Oct. 23, 2018. 5pp.
(Continued)

*Primary Examiner* — Jaime Figueroa
(74) *Attorney, Agent, or Firm* — Hauptman Ham, LLP

(57) ABSTRACT

A robot includes an operation control unit that selects a motion of the robot, a drive mechanism that executes a motion selected by the operation control unit, an eye control unit that causes an eye image to be displayed on a monitor installed in the robot, and a recognizing unit that detects a user. The eye control unit causes a pupil region included in the eye image to change in accordance with a relative position of the user and the robot. A configuration may be such that the eye control unit causes the pupil region to change when detecting a sight line direction of the user, or when the user is in a predetermined range.

23 Claims, 18 Drawing Sheets

(51) Int. Cl.
  *B25J 13/08* (2006.01)
  *B25J 19/04* (2006.01)
(58) Field of Classification Search
  CPC ......... B25J 9/1694; B25J 13/086; A63H 3/40; A63H 11/00
  USPC .................................................. 700/245–264
  See application file for complete search history.

(56) References Cited

U.S. PATENT DOCUMENTS

| | | | |
|---|---|---|---|
| 6,565,371 B1 | 5/2003 | Watanabe | |
| 7,720,572 B2* | 5/2010 | Ziegler | B25J 5/007 713/153 |
| 7,957,837 B2* | 6/2011 | Ziegler | G05D 1/0246 901/1 |
| 10,350,761 B2* | 7/2019 | Yuki | A63H 13/005 |
| 11,000,952 B2* | 5/2021 | Nakagome | A63H 13/005 |
| 2003/0060930 A1* | 3/2003 | Fujita | B25J 9/1602 700/245 |
| 2003/0078696 A1* | 4/2003 | Sakamoto | A63H 11/00 700/258 |
| 2004/0249510 A1* | 12/2004 | Hanson | G06N 3/008 700/245 |
| 2006/0128263 A1* | 6/2006 | Baird | A61B 5/16 446/321 |
| 2007/0192910 A1* | 8/2007 | Vu | B25J 19/06 901/17 |
| 2010/0060713 A1* | 3/2010 | Snyder | G06V 40/20 382/117 |
| 2010/0191156 A1 | 7/2010 | Sakamoto et al. | |
| 2012/0022688 A1* | 1/2012 | Wong | G06N 3/008 700/253 |
| 2012/0303160 A1* | 11/2012 | Ziegler | G16H 70/40 700/259 |
| 2015/0018095 A1* | 1/2015 | Segal | A63F 13/213 463/31 |
| 2015/0206465 A1* | 7/2015 | Yoshikawa | A63H 13/005 40/470 |
| 2017/0148434 A1 | 5/2017 | Monceaux et al. | |
| 2017/0352351 A1* | 12/2017 | Kimura | B25J 13/089 |
| 2018/0104822 A1 | 4/2018 | Yuki et al. | |
| 2018/0370039 A1* | 12/2018 | Nakagome | G06V 40/174 |
| 2019/0279070 A1 | 9/2019 | Hayashi | |

FOREIGN PATENT DOCUMENTS

| | | |
|---|---|---|
| GB | 2331713 A | 6/1999 |
| JP | H5-205030 A | 8/1993 |
| JP | H6-282627 A | 10/1994 |
| JP | H8-305878 A | 11/1996 |
| JP | H11-179061 A | 7/1999 |
| JP | 2000-323219 A | 11/2000 |
| JP | 2003-205489 A | 7/2003 |
| JP | 2004-283975 A | 10/2004 |
| JP | 2005-279896 A | 10/2005 |
| JP | 2006212717 A | 8/2006 |
| JP | 2007-181888 A | 7/2007 |
| JP | 2007-323150 A | 12/2007 |
| JP | 2012155616 A | 8/2012 |
| JP | 2012178092 A | 9/2012 |
| JP | 2018-62042 A | 4/2018 |
| WO | 2009/001558 A1 | 12/2008 |
| WO | 2017056520 A1 | 4/2017 |

OTHER PUBLICATIONS

Dai Miyauchi, Active Eye Contact for Human-Robot Communication, pp. 11-13, 17, 28-29, [online], Feb. 10, 2005,[retrieval date: Oct. 2, 2018], internet <URL:http://www.cv.ics.saitamau.ac.jp/research/thesis/thesis2004/2005M321.pdf>. 52pp.
Office Action in DE Application No. 112018005034.3, dated Jul. 1, 2021. 11pp.
Office Action in CN Application No. 201880058667.3, dated Aug. 2, 2022, 19pp.

* cited by examiner drift/tremor
microsaccade

AUTONOMOUSLY ACTING ROBOT THAT STARES AT COMPANION

RELATED APPLICATIONS

The present application is a continuation of International Application No. PCT/JP2018/033466, filed Sep. 10, 2018, which claims priority from Japanese Application No. 2017-173915, filed Sep. 11, 2017, the disclosures of which applications are hereby incorporated by reference herein in their entirety.

TECHNICAL FIELD

The present invention relates to a robot that autonomously selects an action in accordance with an internal state or an external environment.

BACKGROUND ART

A human keeps a pet in a quest for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to Patent Literature 1).

CITATION LIST

Patent Literature

PTL 1: JP-A-2000-323219

SUMMARY OF INVENTION

Technical Problem

Although robot technology has advanced swiftly in recent years, the technology has not advanced so far as to realize a presence as a pet-like companion. This is because a robot cannot be thought to have free will. By observing behavior such that a pet can only be thought to have free will, a human feels the existence of free will in the pet, empathizes with the pet, and obtains solace from the pet.

As a pet cannot speak, the pet attempts to convey its feelings using its eyes. Eyes are also called a "window to the heart". Staring at a companion means having an interest in the companion. When a human and a pet stare at each other, the human feels a rapport with the pet, and a feeling of affection toward the pet is aroused. The inventors believe that in order to cause a robot to exhibit a "presence as a living being", power of expression of the eyes in the robot, particularly "staring" control, is important.

The invention, having been completed based on the heretofore described recognition, has a main object of proposing an appropriate control method for when a robot stares at a user.

Solution to Problem

An autonomously acting robot in an aspect of the invention includes an operation control unit that selects a motion of the robot, a drive mechanism that executes a motion selected by the operation control unit, an eye control unit that causes an eye image to be displayed on a display device of the robot, and a recognizing unit that detects a user.

The eye control unit causes a pupil region included in the eye image to change in accordance with a relative position of the user and the robot.

An autonomously acting robot in another aspect of the invention includes a camera, a temperature detecting sensor, an operation control unit that selects a motion of the robot, a drive mechanism that executes a motion selected by the operation control unit, an eye control unit that causes an eye image to be displayed on a display device of the robot, and a recognizing unit that detects a user based on a filmed image acquired using the camera or a heat distribution image acquired using the temperature detecting sensor.

The recognizing unit selects either the filmed image or the heat distribution image in accordance with a positional relationship between the robot and the user, and identifies a face region of the user from the selected image.

The eye control unit sets the identified face region as a gaze point, and causes a pupil region included in the eye image to move in accordance with the gaze point.

An autonomously acting robot in another aspect of the invention includes an operation control unit that selects a motion of the robot, a drive mechanism that executes a motion selected by the operation control unit, an eye control unit that causes an eye image to be displayed on a display device of the robot, and a recognizing unit that detects an eye of a user.

The eye control unit sets the eye of the user as a gaze point, causes a sight line of the robot to be directed toward the eye of the user by causing a pupil region included in the eye image to move in accordance with the gaze point, and maintains the sight line of the robot directed toward the eye of the user even when a positional relationship between the robot and the user changes by setting a position of the eye of the user after the change as a new gaze point.

An autonomously acting robot in another aspect of the invention includes an operation control unit that selects a motion of the robot, a drive mechanism that executes a motion selected by the operation control unit, an eye control unit that causes an eye image to be displayed on a display device of the robot, and a recognizing unit that detects a user.

The recognizing unit, furthermore, detects a sight line direction of the user.

The eye control unit sets an eye of the user as a gaze point, causes a sight line of the robot to be directed toward the eye of the user by causing a pupil region included in the eye image to move in accordance with the gaze point, and removes the gaze point from the eye of the user when a sight line of the user is removed from the robot.

Advantageous Effects of Invention

According to the invention, an observer of a robot can more easily be provided with a sensation of being stared at by the robot.

BRIEF DESCRIPTION OF DRAWINGS

FIG. 1A is a front external view of a robot 100. FIG. 1B is a side external view of the robot 100.

Figure 1A:
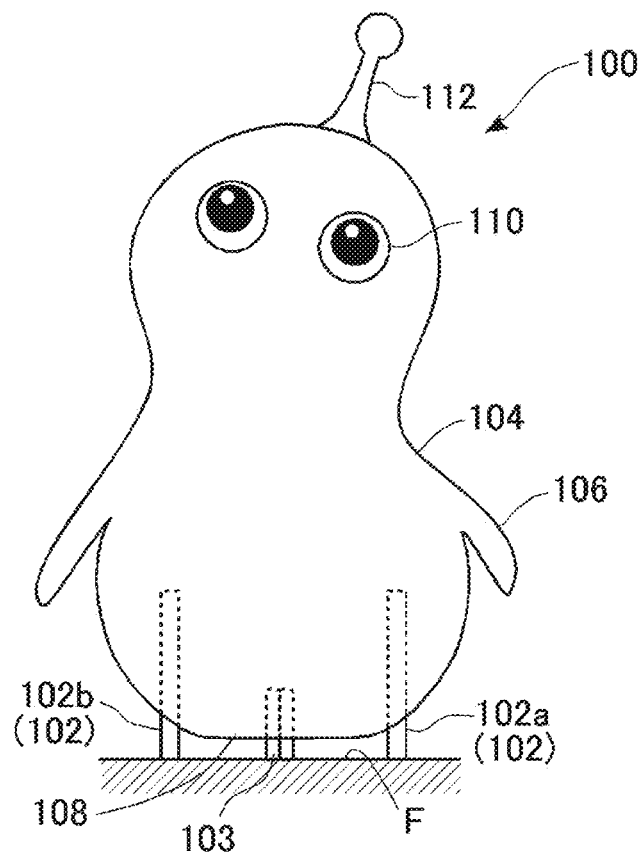
FIG. 1A is a front external view of a robot.
Figure 1B:
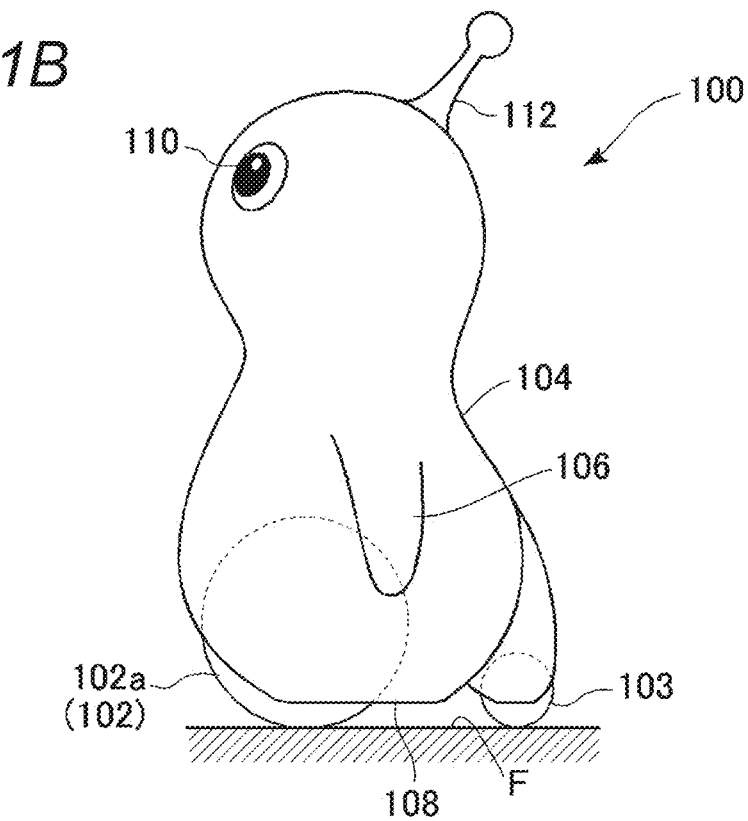
FIG. 1B is a side external view of the robot.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

In principle, the robot 100 has an interior of an owner's home as an action range. Hereafter, a human involved with the robot 100 will be called a "user", and in particular, a user forming a constituent member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent, to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, butt when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

An eye 110 is capable of an image display using a liquid crystal element or an organic EL element. The eye 110 in the embodiment is subjected to an anti-reflection processing whereby an anti-reflection film is affixed to a flat monitor on which an organic EL element is disposed. A convex lens on which an anti-reflection processing has been performed may be attached onto the monitor. Various sensors, such as a microphone array or an ultrasonic sensor that can identify a direction of a sound source, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

A whole-sky camera is attached to the horn 112, and can film a whole of a region above the robot 100 at one time.

Figure 2:
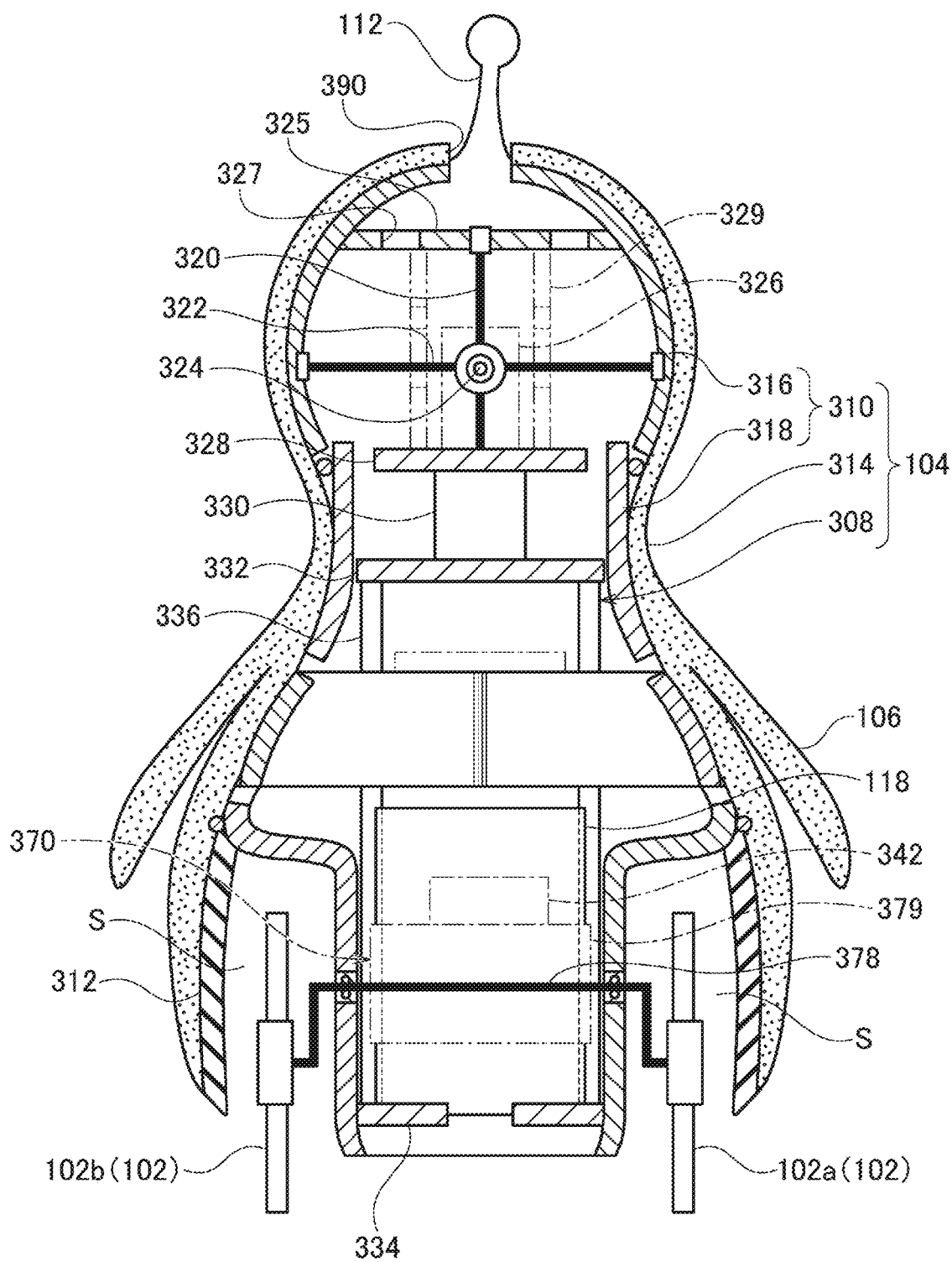
FIG. 2 is a sectional view schematically representing a structure of the robot.

FIG. 2 is a sectional view schematically representing a structure of the robot 100.

As shown in FIG. 2, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control device 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 379 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 3:
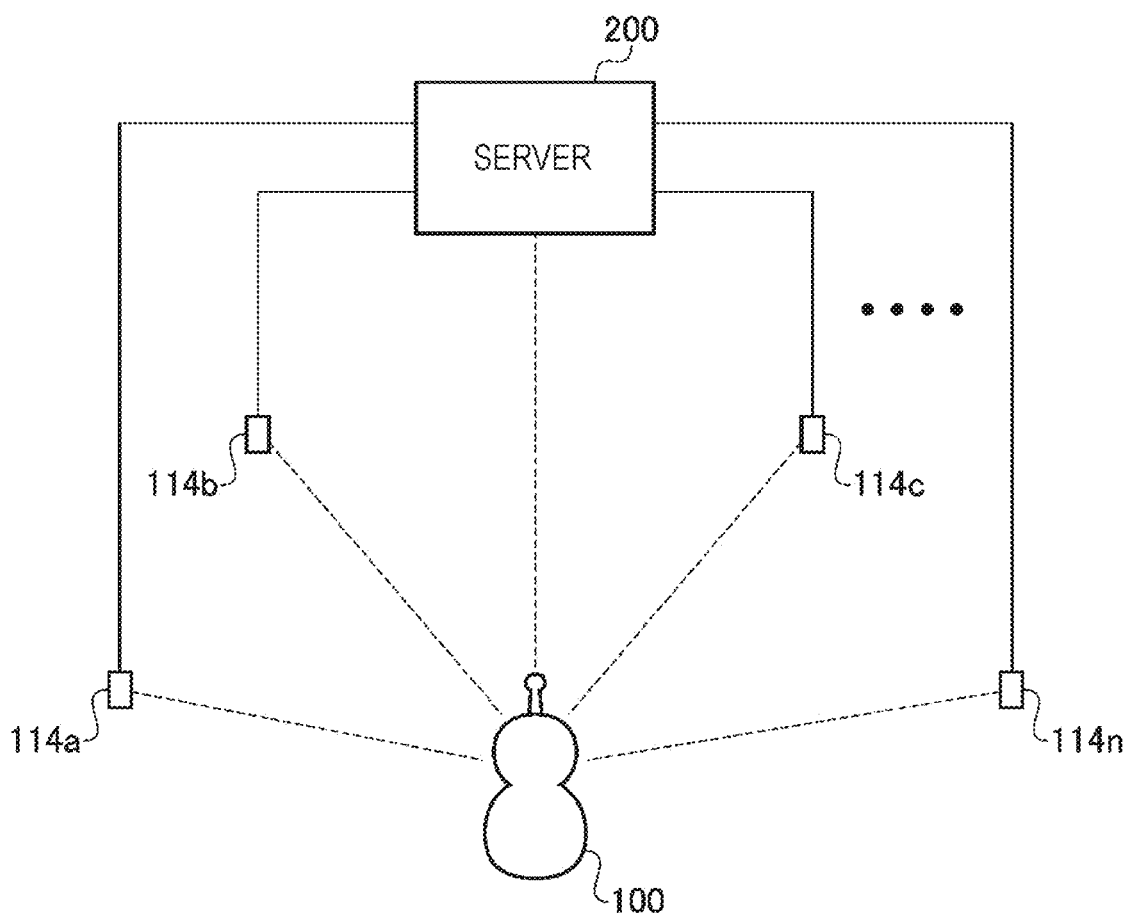
FIG. 3 is a configuration diagram of a robot system.

FIG. 3 is a configuration diagram of a robot system 300.

The robot system. 300 includes the robot 100, a server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment normally correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal") including beacon ID. The server 200 measures a time from, the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 4:
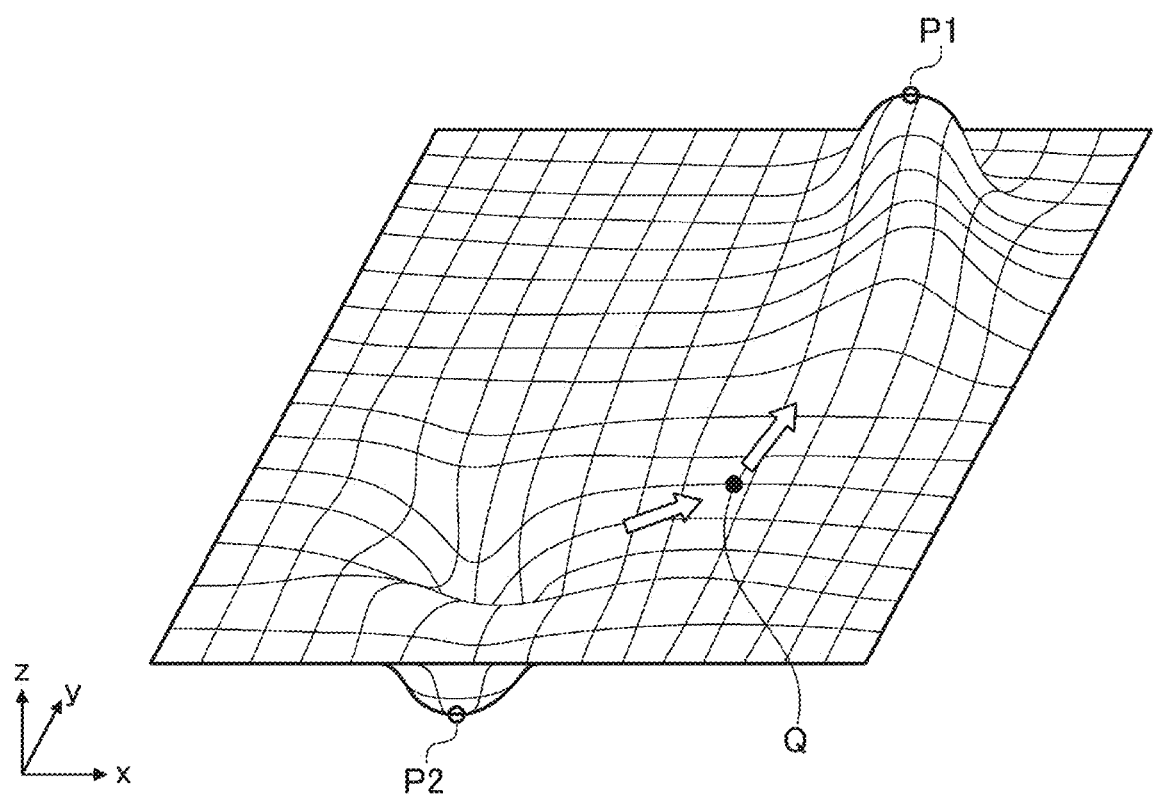
FIG. 4 is a schematic view of an emotion map.

FIG. 4 is a schematic view of an emotion map 116.

The emotion map 116 is a data table stored in the server 200. The robot 100 selects an action in accordance with the emotion map 116. The emotion map 116 shown in FIG. 4 shows a magnitude of an emotional attraction or aversion toward a place of the robot 100. An x axis and a y axis of the emotion map 116 indicate two-dimensional spatial coordinates. A z axis indicates a magnitude of an emotional attraction or aversion. When a z value is a positive value, an attraction toward the place is high, and when the z value is a negative value, the robot 100 is averse to the place.

On the emotion map 116 of FIG. 4, a coordinate P1 is a point in an indoor space managed by the server 200 as the action range of the robot 100 at which an emotion of attraction is high (hereafter called a favored point). The favored point may be, a "safe place", such as behind a sofa or under a table, or may be a place in which people tend to gather or a lively place, like a living room. Also, the safe place may be a place where the robot 100 was gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

When the emotion map 116 shown in FIG. 4 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 4. For example, various action maps such as curiosity, a desire to avoid fear, a desire to seek safety, and a desire to seek physical ease such as quietude, low light, coolness, or warmth, can be defined. Further, an objective point of the robot 100 may be determined by taking a weighted average of the z values of each of a multiple of action maps.

In addition to an action map, the robot 100 has parameters that indicate a magnitude of various emotions or senses. For example, when a value of a loneliness emotion parameter is increasing, a weighting coefficient of an action map that evaluates places in which the robot 100 feels at ease is set high, and the value of this emotion parameter is reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 5:
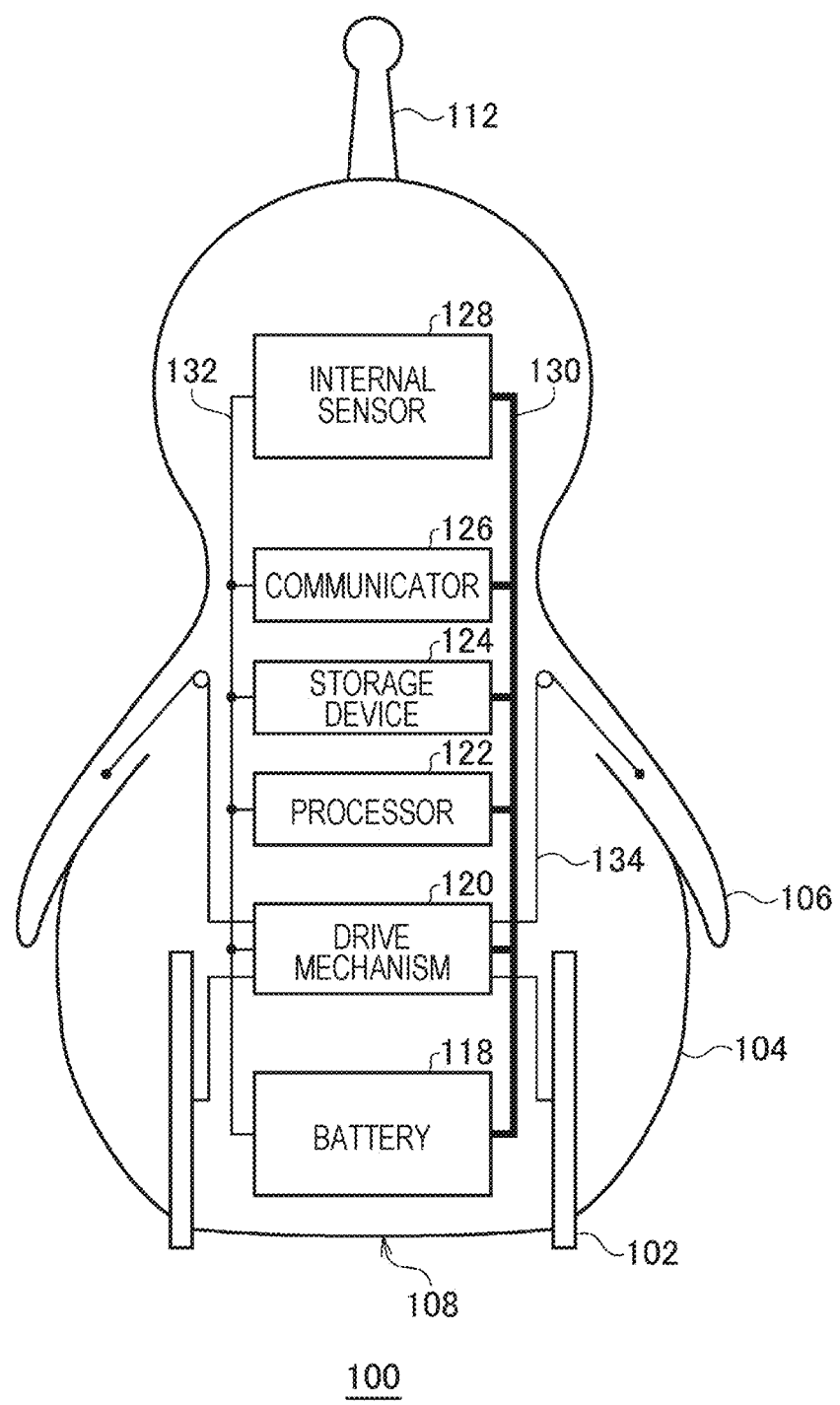
FIG. 5 is a hardware configuration diagram of the robot.

FIG. 5 is a hardware configuration diagram of the robot 100.

The robot 100 includes an internal sensor 128, a communicator 126, a storage device 124, a processor 122, a drive mechanism 120, and a battery 118. The drive mechanism 120 includes the wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera (whole-sky camera), a microphone array, a distance sensor (infrared sensor), a thermosensor, a touch sensor, an acceleration sensor, a smell sensor, and the like. The touch sensor is installed between the outer skin 314 and the main body frame 310, and detects a touch by a user. The smell sensor is an already-known sensor that applies a principle such that electrical resistance changes in accordance with an adsorption of molecules that form a source of a smell.

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheel (the front wheel 102) and the head portion (the head portion frame 316). The drive mechanism 120 changes a direction of movement and a movement speed of the robot 100 by changing the rotational speed and the direction of rotation of each of the two wheels 102. Also, the drive mechanism. 120 can also raise and lower the wheels (the front wheel 102 and the rear wheel 103). When the wheels rise, the wheels are completely stored in the body 104, and the robot 100 comes into contact with the floor surface F via the seating face 108, taking on the sitting state. Also, the drive mechanism 120 controls the arm 106 via a wire 135.

Figure 6:
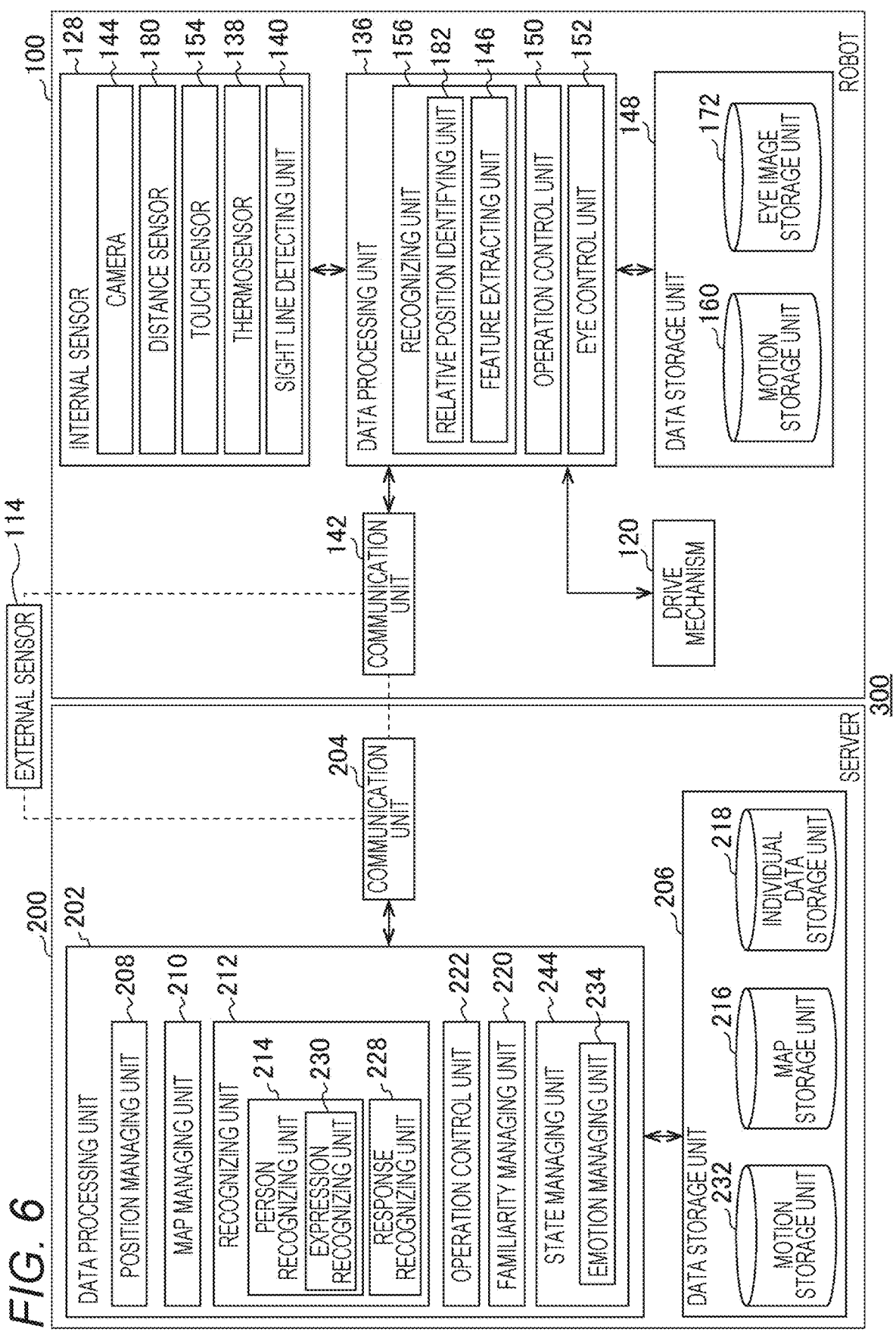
FIG. 6 is a functional block diagram of the robot system.

FIG. 6 is a functional block diagram of a robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206.

The communication unit 204 manages a process of communicating with the external sensor 114 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The data storage unit 206 includes a motion storage unit 232, a map storage unit 216, and an individual data storage unit 218.

The robot 100 has a multiple of operation patterns (motions). Various motions, such as waving the arm 106, approaching an owner while winding, and watching an owner closely with the head tilted, are defined.

The motion storage unit 232 stores control details of a motion (a motion file). Each motion is identified by motion ID. The motion file is also downloaded into a motion storage unit 160 of the robot 100. Which motion is to be executed may be determined in the server 200, or may be determined in the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot. 100 is defined correlated to a time axis in a motion file. Various motions are performed by each actuator being controlled together with the passing of time in accordance with the motion file (actuator control information).

A shift time for changing from a preceding unit motion to a subsequent unit motion is called an "interval". It is sufficient that an interval is defined in accordance with time needed for a unit motion change or details of a motion. A length of an interval can be regulated.

Hereafter, settings involved in controlling an action of the robot 100, such as which motion is chosen and when, and output regulation of each actuator when realizing a motion, will collectively be called "behavioral characteristics". The behavioral characteristics of the robot 100 are defined by a motion selection algorithm, a motion selection probability, a motion file, and the like.

In addition to a motion file, the motion storage unit 232 stores a motion selection table that defines motions that should be executed when various kinds of event occur. One or more motions, and selection probabilities thereof, are correlated to an event in the motion selection table.

In addition to a multiple of action maps, the map storage unit 216 also stores a map showing a disposition situation of an obstacle such as a chair or a table. The individual data storage unit 218 stores information on a user, and in particular, on an owner. Specifically, the individual data storage unit 218 stores master information indicating familiarity toward a user, physical characteristics, and behavioral characteristics. The individual data storage unit 218 may also store attribute information such as age and gender.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, a familiarity managing unit 220, and a state managing unit 244.

The position managing unit 208 identifies the positional coordinates of the robot 100 using the method described using FIG. 3. The position managing unit 208 may also track positional coordinates of a user in real time.

The state managing unit 244 manages various kinds of internal parameter such as a charging rate, an internal temperature, and various kinds of physical state such as a processing load of the processor 122. The state managing unit 244 includes an emotion managing unit 234.

The emotion managing unit 234 manages various emotion parameters indicating emotions (loneliness, curiosity, desire for approval, and the like) of the robot 100. These emotion parameters constantly fluctuate. The importance of the multiple of action maps changes in accordance with the emotion parameters, a movement target point of the robot 100 changes in accordance with the action maps, and the emotion parameters change in accordance with movement of the robot 100 and the passing of time.

For example, when the emotion parameter indicating loneliness is high, the emotion managing unit 234 sets the weighting coefficient of the action map that evaluates places in which the robot 100 feels at ease to be high. When the robot 100 reaches a point on the action map at which loneliness can be eliminated, the emotion managing unit 234 reduces the emotion parameter indicating loneliness. Also, each kind of emotion parameter also changes in accordance with a response action to be described hereafter. For example, the emotion parameter indicating loneliness decreases when the robot 100 is "hugged" by an owner, and the emotion parameter indicating loneliness increases little by little when the robot 100 does not visually recognize an owner for a long time.

The map managing unit 210 changes the parameter of each coordinate on the multiple of action maps using the method described in connection with FIG. 4. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map 13, the total z value at the coordinate P1 is 4×5−1=19, and the total z value at the coordinate R1 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 156 of the robot 100 acquires various kinds of environmental information using the internal sensor 128, and after carrying out a primary processing of the environmental information, transfers the environmental information to the recognizing unit 212 of the server 200.

Specifically, the recognizing unit 156 of the robot 100 extracts an image region corresponding to a moving object, particularly a person or an animal, from an image, and extracts a "feature vector" as a collection of feature quantities indicating physical characteristics and behavioral characteristics of the moving object from, the extracted image region. A feature vector component (feature quantity) is a numeral wherein various kinds of physical and behavioral characteristic are quantified. For example, a horizontal width of a human eye is quantified in a range of 0 to 1, forming one feature vector component. Already-known facial recognition technology is applied as a method of extracting a feature vector from a filmed image of a person. The robot 100 transmits the feature vector to the server 200.

The recognizing unit 212 of the server 200 further includes a person recognizing unit 214 and a response recognizing unit 228.

The person recognizing unit 214 determines what person a filmed user corresponds to by comparing a feature vector extracted from an image filmed by the camera incorporated in the robot 100 and a feature vector of a user (cluster) registered in advance in the individual data storage unit 218 (a user identification process). The person recognizing unit 214 includes an expression recognizing unit 230. The expression recognizing unit 230 infers an emotion of a user by carrying out image recognition of an expression of the user.

The person recognizing unit 214 also carries out a user recognition process on a moving object ocher than a person, for example, a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 of the server 200 determines a motion of the robot 100 in cooperation with an operation control unit 150 of the robot 100. The operation control unit 222 of the server 200 compiles a movement target point of the robot 100, and a movement route for the movement target point, based on an action map selection by the map managing unit 210. The movement control unit 222 compiles a multiple of movement routes, and having done so, may select any of the movement routes.

The operation control unit 222 selects a motion of the robot 100 from a multiple of motions of the motion storage unit 232. A selection probability is correlated for each situation to each motion. For example, a selection method such that a motion A is executed at a probability of 20% when a pleasant action is performed by an owner, and a motion B is executed at a probability of 5% when an air temperature is 30 degrees or higher, is defined.

A movement target point and a movement route are determined by an action map, and a motion is selected in accordance with various kinds of event to be described hereafter.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that owner. When an unpleasant action is detected, the familiarity managing unit 220 reduces familiarity. Also, familiarity of an owner not visually recognized for a long period gradually decreases.

Robot 100

The robot 100 includes a communication unit 142, a data processing unit 136, a data storage unit 148, the internal sensor 128, and the drive mechanism 120.

The communication unit 142 corresponds to the communicator 126 (refer to FIG. 5), and manages a process of communicating with the external sensor 114, the server 200, and another robot 100. The data storage unit 148 stores various kinds of data. The data storage unit 148 corresponds to the storage device 124 (refer to FIG. 5). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 123, the drive mechanism 120, and the data storage unit 148.

The data storage unit 143 includes a motion storage unit 160, which defines various kinds of motion of the robot 100, and an eye image storage unit 172.

Various kinds of motion file are downloaded from the motion storage unit 232 of the server 200 into the motion storage unit 160 of the robot 100. A motion is identified by motion ID. An operating timing, an operating time, an operating direction, and the like, of the various kinds of actuator (the drive mechanism 120) are defined chronologically in the motion file in order to perform various motions such as sitting by housing the front wheels 102, raising the arm 106, causing the robot 100 to carry out a rotating action by causing the two front wheels 102 to rotate in reverse or by causing only one front wheel 102 to rotate, shaking by causing the front wheels 102 to rotate in a state in which the front wheels 102 are housed, or stopping once and looking back when moving away from a user.

Various kinds of data may also be downloaded from the map storage unit 216 and the individual data storage unit 218 into the data storage unit 148. The eye image storage unit 172 stores data relating to an eye image (to be described hereafter) displayed in the eye 110.

The internal sensor 128 includes a touch sensor 154, a thermosensor 138, a sight line detecting unit 140, a camera 144, and a distance sensor 180.

The camera 144 in the embodiment is a whole-sky camera (omnidirectional camera) attached to the horn 112. The camera 144 constantly films a periphery of the robot 100. The thermosensor 138 regularly detects an external air temperature distribution in the periphery of the robot 100. The robot 100 detects whether or not a user exists in the periphery using the camera 144 and the thermosensor 138. The sight line detecting unit 140 is an already-known sensor that detects eye movement of a user from an image filmed by the camera 144. A direction of a sight line of a user with respect to the robot 100 is detected by the sight line detecting unit 140.

The touch sensor 154 detects a touch by a user on the body 104. The distance sensor 180 is an already-known sensor that measures a distance to a target object.

The data processing unit 136 includes the recognizing unit 156, an operation control unit 150, and an eye control unit 152.

The operation control unit 150 of the robot 100 determines a motion of the robot 100 in cooperation with the operation control unit 222 of the server 200. One portion of motions may be determined by the server 200, and other motions may be determined by the robot 100. Also, a configuration may be such that the robot 100 determines a motion, but the server 200 determines a motion when a processing load of the robot 100 is high. A motion that forms a base may be determined by the server 200, and an additional motion determined by the robot 100. It is sufficient that a way in which a motion determining process is divided between the server 200 and the robot 100 is designed in accordance with the specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheel 102 in accordance with an instruction from the operation control unit 150.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by repeatedly causing the left and right front wheels 102 to alternately rotate in reverse and stop in a housed state when bored of the "hug". The drive mechanism 120 causes the robot 100 to perform, various motions by driving the front wheel 102, the arm 106, and the neck (head portion frame 316) in accordance with an instruction from the operation control unit 150.

The eye control unit 152 generates an eye image, and causes the eye image to be displayed on a monitor installed in the eye 110. Details of an eye image will be described hereafter.

The recognizing unit 156 of the robot 100 analyzes external information obtained from the internal sensor 128. The recognizing unit 156 is capable of visual recognition (a visual unit), smell recognition (an olfactory unit), sound recognition (an aural unit), and tactile recognition (a tactile unit). A relative position identifying unit 182 included in the recognizing unit 156 identifies a relative positional relationship between the robot 100 and an observation target.

The recognizing unit 156 detects a moving object such as a person or a pet based on an image (omnidirectional image) filmed by the camera 144. The recognizing unit 156 includes a feature extracting unit 146. The feature extracting unit 146 extracts a feature vector from a filmed image of a moving object. As heretofore described, a feature vector is a collection of parameters (feature quantities) indicating physical characteristics and behavioral characteristics of a moving object. When a moving object is detected, physical characteristics and behavioral characteristics are also extracted from the smell sensor, an incorporated highly directional microphone, a temperature sensor, and the like. These characteristics are also quantified, forming feature vector components.

The robot system 300 clusters users appearing with a high frequency as "owners" based on physical characteristics and behavioral characteristics obtained from a large amount of image information or other sensing information.

For example, when a moving object (user) having a beard is often active in the early morning (gets up early) and rarely wears red clothing, a first profile of a cluster (user) that gets up early, has a beard, and does not often wear red clothing is created. Meanwhile, when a moving object wearing spectacles often wears a skirt but the moving object does not have a beard, a second profile of a cluster (user) that wears spectacles and wears a skirt but definitely does not have a beard is created.

Although the above is a simple example, the first profile, corresponding to a father, and the second profile, corresponding to a mother, are formed using the heretofore described method, and the robot 100 recognizes that there are at least two users (owners) in the house.

Note that the robot 100 does not need to recognize that the first profile is the "father". It is always sufficient that the robot 100 can recognize a personal profile that is a "cluster that has a beard, often gets up early, and hardly ever wears red clothing". A feature vector in which the profile is characterized is defined for each profile.

It is assumed that the robot 100 newly recognizes a moving object (user) in a state wherein this kind of cluster analysis is completed.

At this time, the person recognizing unit 214 of the server 200 executes a user identification process based on the feature vector of the new moving object, and determines what profile (cluster) the moving object corresponds to. For example, when a moving object having a beard is detected, the probability that the moving object is the father is high. When the moving object is active early in the morning, it is even more certain that the moving object corresponds to the father. Meanwhile, when a moving object wearing spectacles is detected, there is a possibility that the moving object is the mother. When the moving object has a beard, the moving object is neither the mother nor the father, because of which the person recognizing unit 214 determines that the moving object is a new person who has not been cluster analyzed.

Formation (cluster analysis) of a cluster (profile) by feature extraction and matching with a cluster in accompaniment to feature extraction may be executed concurrently. Characteristics of an owner may be registered in advance. Further, when an unknown user is detected, the feature extracting unit 146 extracts a feature vector from the user, and the person recognizing unit 214 may carry out person identification by determining whether the feature vector corresponds to any already-known owner.

Of a series of recognition processes including detecting, analyzing, and determining, the recognizing unit 156 of the robot 100 carries out a selection and extraction of information necessary for recognition, and an analyzing process such as determining is executed by the recognizing unit 212 of the server 200. The recognition processes may be carried out by the recognizing unit 212 of the server 200 alone, or carried out by the recognizing unit 156 of the robot 100 alone, or the two may execute the recognition processes while dividing roles as heretofore described.

When a strong force is applied to the robot 100, the recognizing unit 156 recognizes this using the incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of facing the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 recognizes that a "touching action" has been performed by a user, and when upward acceleration is detected in a state in which touching is recognized, the response recognizing unit 228 recognizes that a "hug" has been perform. Physical contact when a user picks up the body 104 may also be sensed, and a hug may also be recognized by a load acting on the front wheels 102 decreasing.

To summarize, the robot. 100 acquires an action of a user as physical information using the internal sensor 128, the response recognizing unit 228 of the server 200 determines whether the action is pleasant or unpleasant, and the recognizing unit 212 of the server 200 executes a user identification process based on the feature vector.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant, actions relate to familiarity, and positive and negative responses affect action selection of the robot 100.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

Depending on what kind of action the robot 100 is subjected to by a moving object (user), familiarity with respect to the user changes.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempt to approach a person with high familiarity, and attempts to move away from a person with low familiarity.

Actions of the robot 100 are classified below in accordance with familiarity.

(1) A user with extremely high familiarity
The robot 100 strongly expresses a feeling of affection by approaching a user (hereafter called an approaching action), and performing an affectionate gesture defined in advance as a gesture indicating goodwill toward a person.

(2) A user with comparatively high familiarity
The robot 100 carries out only an approaching action.
(3) A user with comparatively low familiarity
The robot 100 does not carry out any special action.
(4) A user with particularly low familiarity
The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

The recognizing unit 156 detects a position of a user's face using, the camera 144 and the thermosensor 138. The relative position identifying unit 182 of the recognizing unit 156 measures a distance from the robot 100 to a user (hereafter called a "target distance") using the distance sensor 180. The relative position identifying unit 182 may measure the target distance based on the size of a user's face identified from a filmed image or a heat distribution image.

Figure 7:
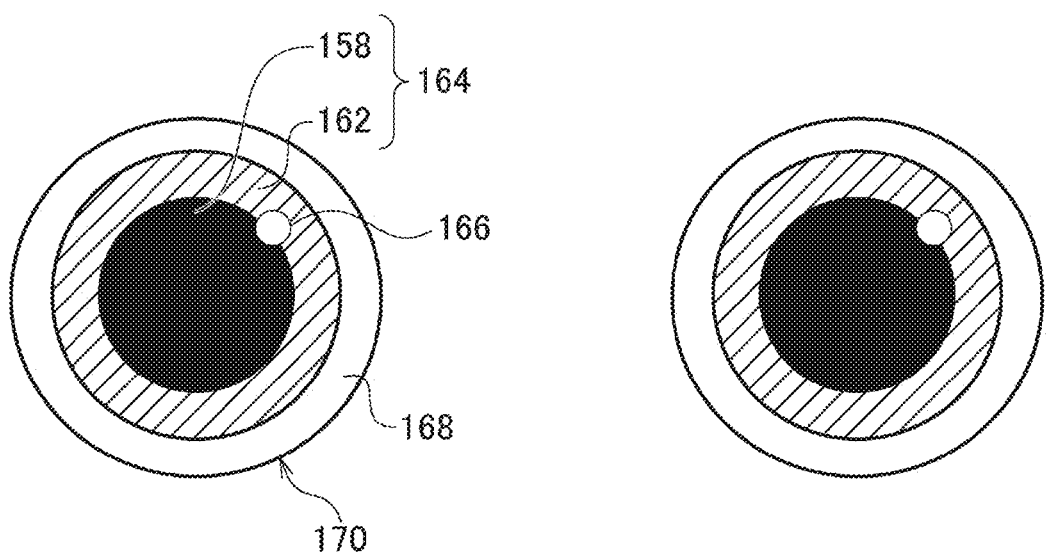
FIG. 7 is an external view of an eye image.

Eye Image Control
FIG. 7 is an external view of an eye image 174.
The eye control unit 152 generates the eye image 174, which includes a pupil image 164 (a pupil region) and a peripheral edge image 168, and causes the eye image 174 to be displayed as a moving image on a monitor 170 embedded in the position of the eye 110. A "sight line" of the robot 100 is represented by moving the pupil image 164. Also, a blinking action can also be executed at a predetermined timing.

The pupil image 164 includes a pupillary region 158 and an iris region 162. Also, a catch light 166 for representing a reflection of external light is also displayed in the pupil image 164. Rather than shining owing to a reflection of external light, the catch light 166 of the eye image 174 is an image region represented as a region of high luminance by the eye generating unit 152.

The eye control unit 152 can cause the pupil image 164 to move vertically and horizontally. When the recognizing unit 156 of the robot 100 recognizes a user, the eye control unit 152 directs the pupil image 164 in the direction in which the user exists. The eye control unit 152 represents a "gaze" of the robot 100 by causing the eye image 174 to change.

Details of control of the eye image 174 will be described hereafter in connection with FIG. 9.

The eye control unit 152 may cause a form of the pupil image 164 to change. For example, a perfectly circular form is adopted when the pupil image 164 is in the center of the monitor 170, and the form is changed to an elliptical form when the pupil image 164 is in a peripheral edge portion. By the form of the pupil image 164 being changed in accordance with a position on the monitor 170, the flat monitor 170 can be caused to appear to be of a curved form like an actual eyeball.

The eye control unit 152 causes a position of the catch light 166 to change in response to a direction in which an external light source exists. FIG. 7 shows a display position of the catch light 166 when an external light source exists above and to the left as seen from the robot 100. By linking the position of the catch light 166 to an external light source, a more realistic eye image 174 can be represented. The eye control unit 152 may determine the direction of the external light source using image recognition based on a filmed image, or may determine the direction from data detected by a photosensor (not shown).

Figure 8:
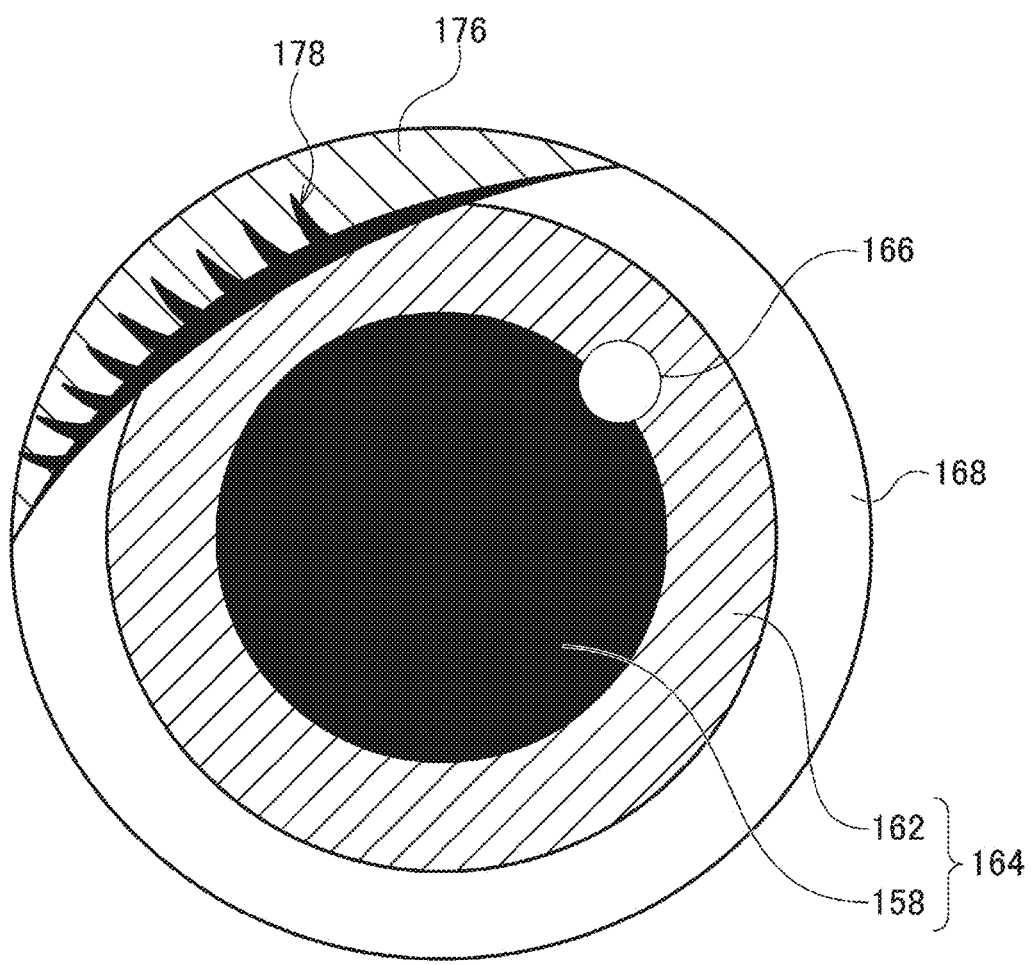
FIG. 8 is an enlarged view of the eye image.

FIG. 8 is an enlarged view of the eye image 174.

An eyelid image 176 showing an eyelid is superimposed on the pupil image 164 and the peripheral edge image 168 in the eye image 174. The eyelid image 176 includes an eyelash 178. The peripheral edge image 168 is a portion corresponding to a human conjunctiva. The iris region 162 included in the pupil image 164 is a portion corresponding to a human cornea.

Of the eye image 174, the eye control unit 152 causes the eyelid image 176, the pupillary region 158, the iris region 162, and the catch light 166 to change. When the light intensity is high, the eye control unit 152 reduces a diameter of the pupillary region 158. The eye control unit 152 may cause not only the pupillary region 158 but a whole of the pupil image 164 to be enlarged. When the light intensity is particularly high, the eye control unit 152 may represent an "appearance of seeming dazzled" by lowering the eyelid image 176.

Figure 9:
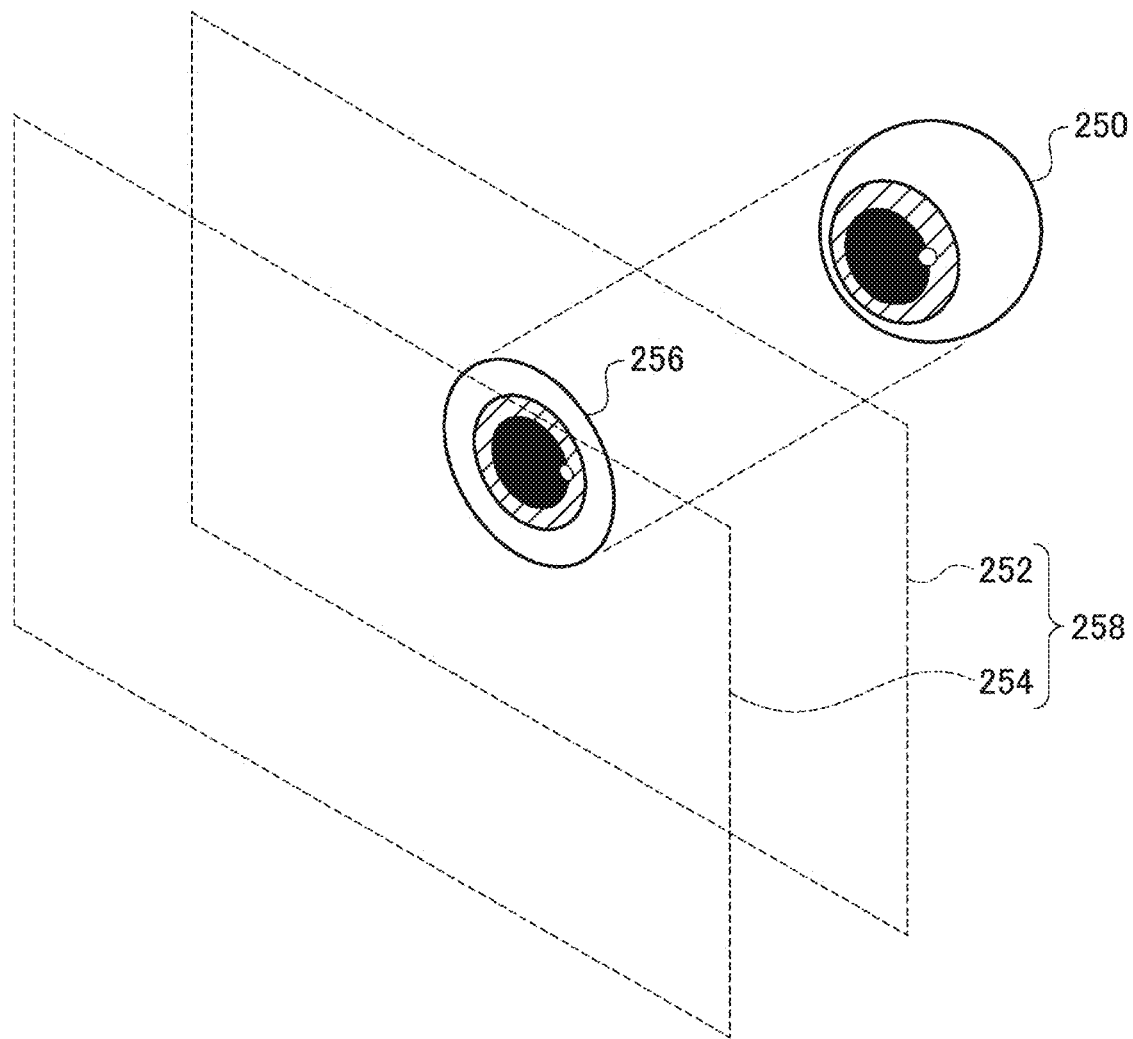
FIG. 9 is a schematic view showing an eye image generation method.

FIG. 9 is a schematic view showing a method of generating the eye image 174.

An eyeball model 250 is a three-dimensional computer graphic that imitates an eyeball of the robot 100. Firstly, the eye control unit 152 forms a three-dimensional sphere using polygons, and forms the eyeball model 250 by affixing a texture (hereafter called an "eyeball texture") to the three-dimensional sphere. The eyeball texture is an image including the pupil image 164. The eye image storage unit 172 stores multiple kinds of eyeball texture.

A first face 252 and a second face 254 are set in front of the eyeball model 250. The first face 252 and the second face 254 are virtual planes corresponding to display faces of the monitor 170 of the eye 110. The eye control unit 152 generates a two-dimensional eyeball projection image 256 from the three-dimensional eyeball model 250 by projecting the eyeball model 250 onto the first face 252.

The eye control unit 152 causes the eyelid image 176 to be displayed on the second face 254. The eye image 174 shown in FIG. 8 and the like is generated by the eyeball projection image 256 of the first face 252 and the eyelid image 176 of the second face 254 being superimposed one on the other. The eye control unit 152 generates two eyeball models 250, one each for the right eye and the left eye, and generates the eye image 174 for each eyeball model 250. Hereafter, the first face 252 and the second face 254 will be called "eyeball faces 253" when referring to both together.

The eye control unit 152 causes the eyeball projection image 256 to change by causing the eyeball model 250 to rotate. As the method is such that the three-dimensional eyeball model 250 is generated, and projected onto the first face 252 while being caused to rotate, movement of the sight line of the robot 100 can be represented more smoothly than by drawing the eye image 174 directly onto the first face 252. With this method, a complex movement peculiar to the eyeball of an animal, such as an involuntary eye movement to be described hereafter, is easily represented even in the case of the two-dimensional eye image 174, as the eye image 174 is generated and controlled based on the three-dimensional eyeball model 250.

By causing the eyelid image 176 to be displayed on the second face 254, which differs from the first face 252, the eye control unit 152 causes the eyelid image 176 to be superimposed on the eyeball projection image 256. A human closes the eyes reflexively when hands are clapped in front of the eyes. When providing the robot 100 with this kind of conditioned reflex of the eyes, it is necessary to cause the eyelid image 176 to change at high speed. In the embodiment, image processing of the first face 252 and image processing of the second face 254 are independent. It is sufficient that the eye control unit 152 carries out image control with only the second face 254 as a target when representing a closing of the eyes. When blinking too, it is sufficient that the eye control unit 152 executes image processing with the second face 254 as a target. As the eyeball model 250 (the eyeball projection image 256) and the eyelid image 176 can be controlled separately, the eyelid image 176 can be controlled at high speed.

Figure 10:
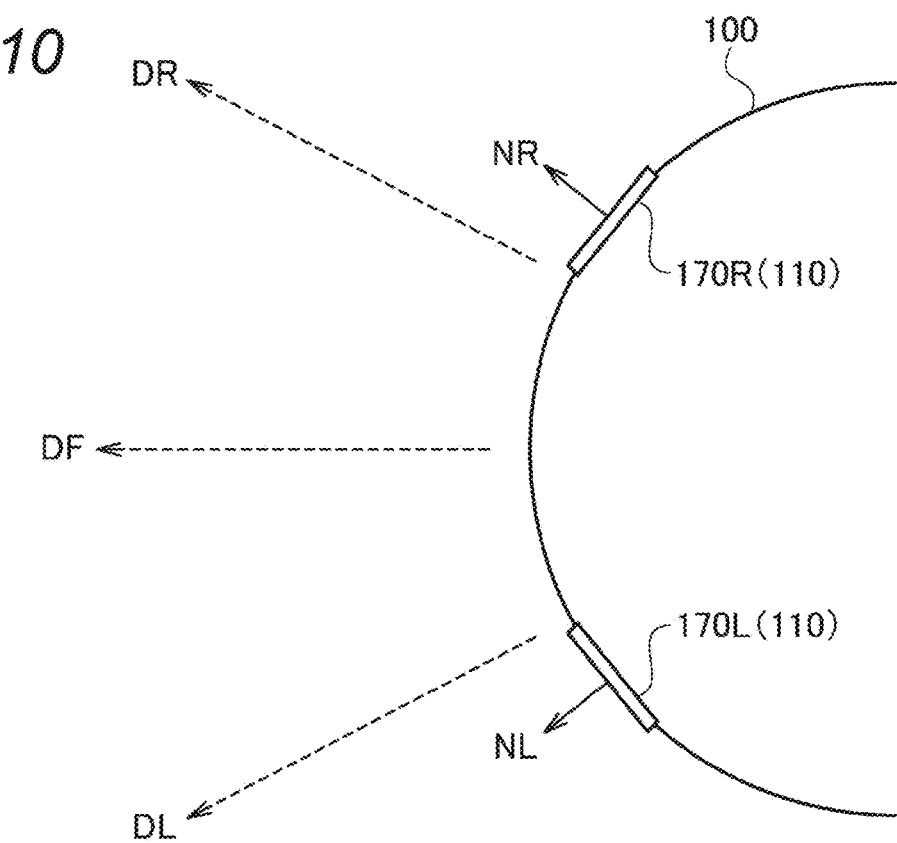
FIG. 10 is a schematic view for describing a relationship between a sight line direction and a target direction.

FIG. 10 is a schematic view for describing a relationship between a sight line direction and a target direction.

An animal has a spherical eyeball, and causes a sight line direction to change by causing the eyeball to rotate. For example, a reason that the sight line of a dog is sensed even when a human is on the left side of the dog is that the dog can cause the eyeball to rotate, thereby directing the pupil toward the human on the left. A direction directly ahead of the dog's pupil, or in other words, a central line direction (normal direction) of the pupil in the dog's eyeball face, represents the dog's sight line direction. At this time, the dog's pupil appears perfectly circular to the human. The dog can stare at the human using a so-called "sidelong look" by moving the eyeball, thereby changing the normal direction (sight line direction) of the pupil, even without moving the body or the neck.

As heretofore described, it is necessary to direct the normal direction of the pupil image 164 toward a target of a stare (hereafter called an "observation target") in order to represent a stare in the robot 100. The eye 110 of the robot 100 in the embodiment is generated by displaying the eye image 174 on the monitor 170. The monitor 170 is a flat display device fixed to the body 104. Consequently, the sight line direction of the eye 110 (the normal direction of the pupil) of the robot 100 is fixed.

FIG. 10 is a drawing wherein the robot 100 is seen from directly above. A right eye normal NR represents a normal direction (sight line direction) of a right eye monitor 170R, and a left eye normal NL represents a normal direction (sight line direction) of a left eye monitor 170L. Provided that neither the head portion frame 316 nor the trunk portion frame 318 is caused to rotate, the robot 100 cannot move the right eye normal NR (right eye sight line) or the left eye normal NL (left eye sight line).

Hereafter, a direction toward an observation target from the robot 100 will be called a "target direction". The relative position identifying unit 182 identifies not only a target distance but also a target direction. When an observation target exists on the right of the robot 100, the right normal NR and a target direction DR are close together, because of which the observation target can sense that he or she is being stared at by the right eye of the robot 100. Meanwhile, the left normal NL and the target direction DR differ considerably, because of which the observation target is unlikely to sense that he or she is being stared at by the left eye of the robot 100. In the same way, when an observation target exists on the left of the robot 100, the observation target can sense that he or she is being stared at by the left eye of the robot 100, but is unlikely to sense a sight line from the right eye.

When an observation target exists in front of the robot 100, neither the right normal NR not the left normal NL coincide with a target direction DF. The observation target is unlikely to sense a sight line from either the left or right eye of the robot 100.

Figure 11:
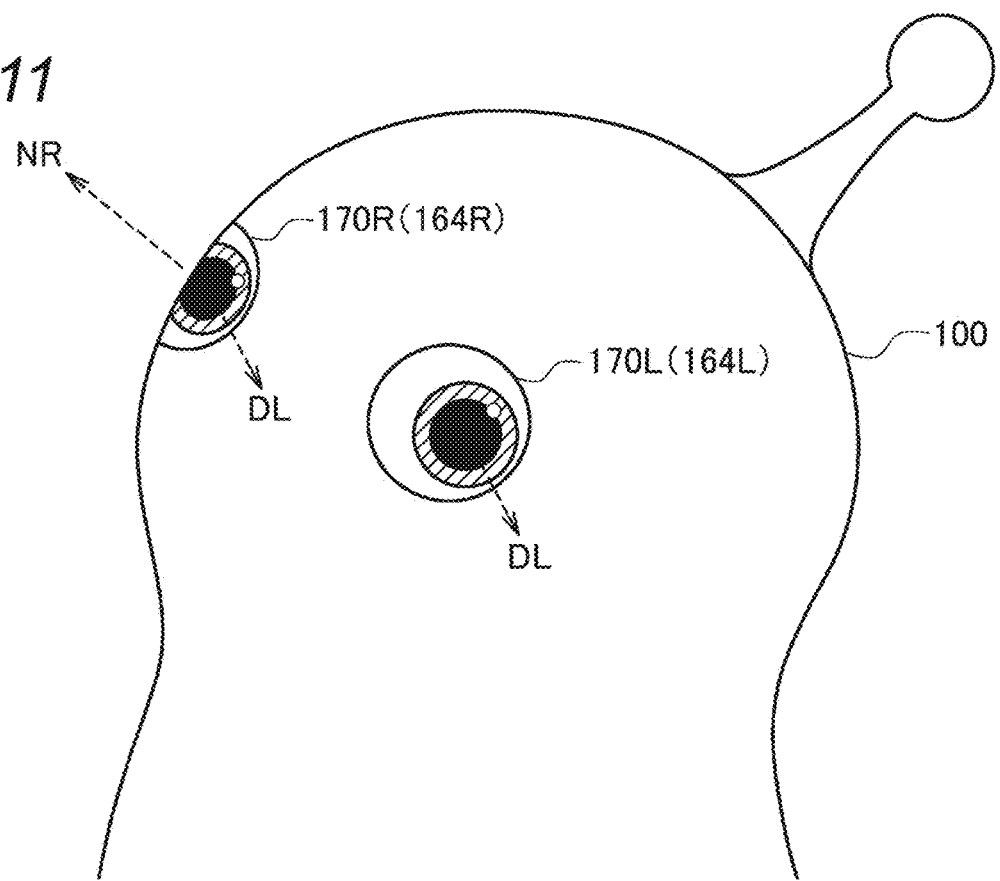
FIG. 11 is an external view of the robot when an observation target is positioned on the left of the robot.

FIG. 11 is an external view of the robot 100 when an observation target is positioned on the left of the robot 100.

In FIG. 11, an observation target is positioned on the left side of the robot 100. As the left eye normal NL and the target direction DL practically coincide, the observation target can sense that he or she is being stared at by the left eye of the robot 100 provided that the pupil image 164 of the left eye monitor 170L (hereafter written as a "left pupil image 164L") is moved a little in a left direction. Meanwhile, the right eye normal NR and the target direction DL differ considerably. Even when the eye control unit 152 causes the pupil image 164 of the right eye monitor 170R (hereafter written as a "right pupil image 164R") to move in the left direction, the observation target is unlikely to sense a sight line from the right eye of the robot 100. This is because the right eye normal NR (right eye sight line direction) is not directed toward the observation target. When the target distance is short, a feeling of strangeness in not being stared at by the right eye despite being stared at by the left eye is liable to become stronger.

The deviation between the right eye normal HR and the target direction DL can be reduced by the operation control unit 150 moving the head portion frame 316 in the left direction. However, there is also a limit to an amount of turn of the head portion frame 316. Also, there is also a case wherein the robot 100 wishes to realize an action of directing only the sight line toward the observation target, without moving the neck.

When sensing a sight line, the observation target and a companion's pupil are directly opposed. It is supposed that when the pupil image 164 of the robot 100 appears perfectly circular to the observation target, the observation target can sense that he or she is being stared at by the robot 100. As the monitor 170 in the embodiment is fixed to the main body, the monitor 170 cannot be directed toward the observation target and caused to rotate like an eyeball. Also, as the monitor 170 is a flat display, the sight line direction does not change in accordance with the position of the pupil image 164. Therefore, the embodiment is such that when the right eye normal PR and the target direction DL deviate, a simulated change in the sight line direction of a right eye image 174R is caused by causing a transformation of the pupil image 164.

Figure 12A:
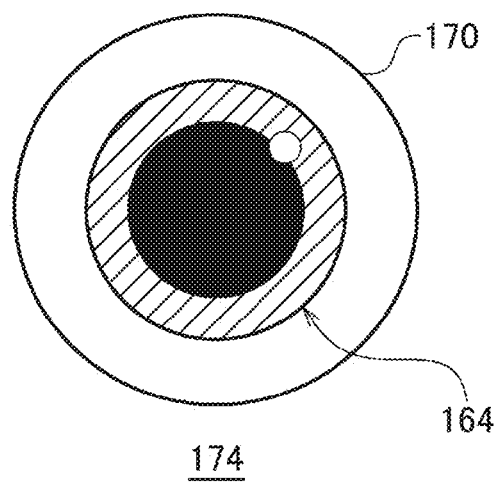
FIG. 12A is a drawing showing a display aspect of the eye image at a normal time.
Figure 12B:
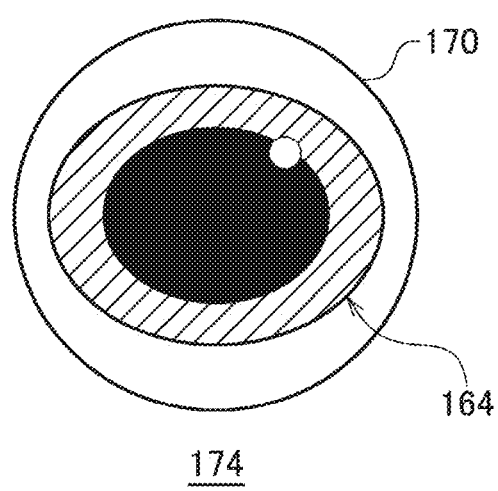
FIG. 12B is a drawing showing a display aspect of the eye image when flattened.
Figure 12C:
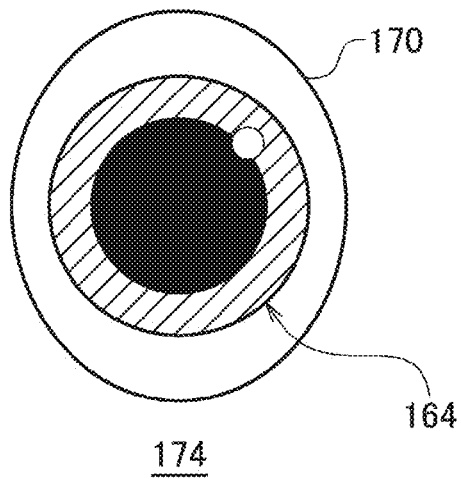
FIG. 12C is a drawing showing an aspect of visual recognition from an oblique direction of the eye image shown in FIG. 12B.

FIG. 12A is a drawing showing a display aspect of the eye image 174 at a normal time. FIG. 12B is a drawing showing a display aspect of the eye image 174 when flattened. FIG. 12C is a drawing showing an aspect of visual recognition from an oblique direction of the eye image 174 shown in FIG. 12B.

In the embodiment, in order to restrict a feeling of strangeness accompanying a deviation between the sight line direction (normal direction) and the target direction, the eye control unit 152 causes a simulated movement of the sight line direction of the pupil image 164 by causing the pupil image 164 to be flattened. (hereafter called a "pupil flattening process"). The pupil flattening process is a process whereby the pupil image 164 is compressed in a vertical direction, thereby causing transformation of the pupil image 164 into a horizontally long elliptical form.

When the observation target is on the left side of the robot 100, the observation target directly faces the display face of the left eye monitor 170L. At this time, the eye control unit 152 does not cause the pupil image 164 of the left eye to be flattened. As a perfectly circular left eye image 174L and the perfectly circular pupil image 164 are visible to the observation target, the observation target can sense the sight line of the left eye of the robot 100.

Meanwhile, as the observation target sees the right eye monitor 170R from an oblique left direction (refer to FIG. 11), the right eye monitor 170R appears in a vertically long form. This is the same as a circular coin appearing vertically long when the coin is seen obliquely. The eye control unit 152 causes the right eye pupil image 164 to be flattened, as shown in FIG. 12B. When the pupil image 164 flattened so as to be horizontally long is seen from the oblique left direction, the pupil image 164 appears perfectly circular, as shown in FIG. 12C. As the monitor 170 is flattened so as to be vertically long when the monitor 170 is seen obliquely, the pupil image 164 is displayed as being almost perfectly circular provided that the pupil image 164 is flattened so as to be horizontally long.

Figure 13:
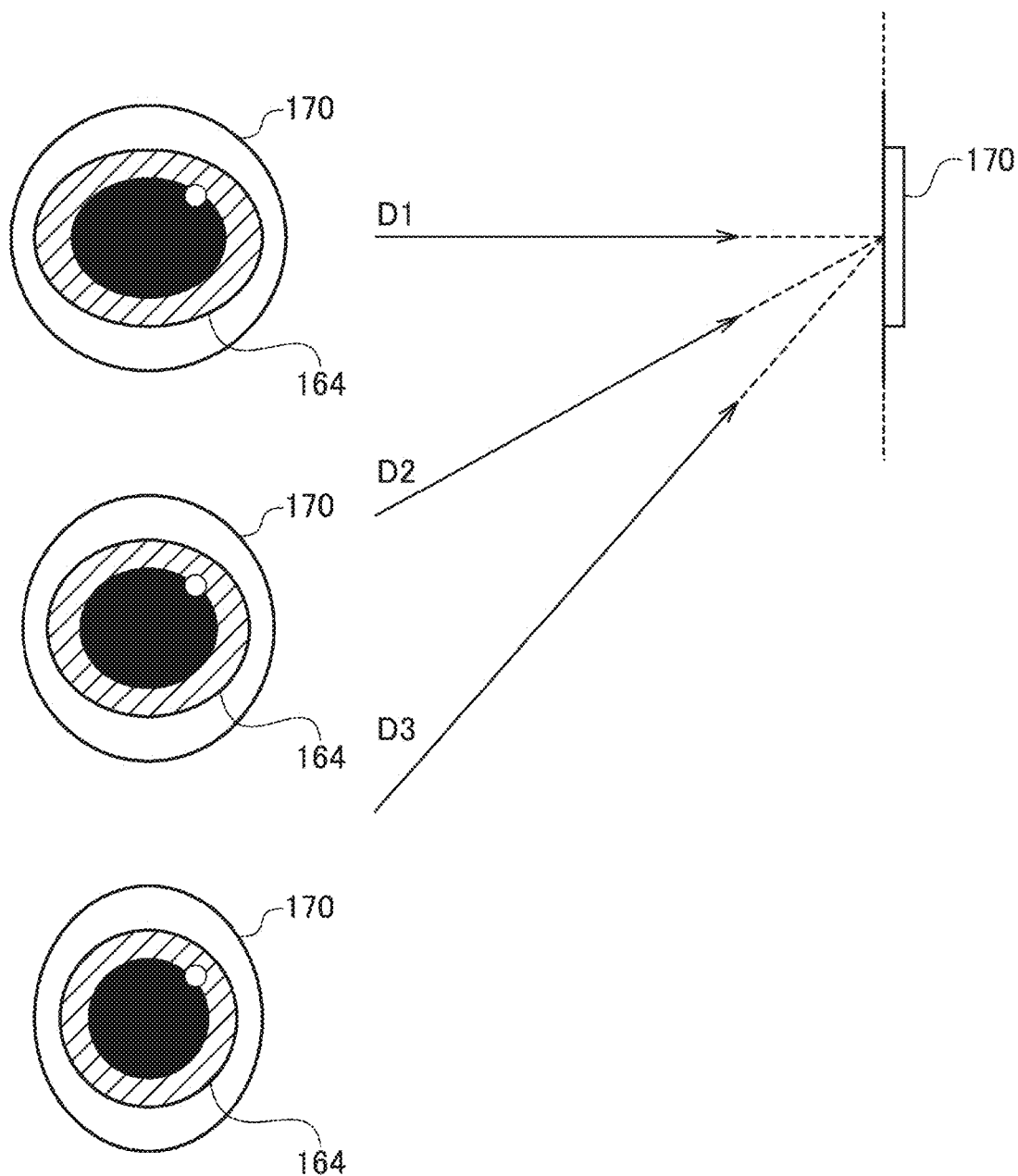
FIG. 13 is a schematic view showing target directions and how a monitor and a pupil image appear.

FIG. 13 is a schematic view showing target directions and how the monitor 170 and the pupil image 164 appear.

In FIG. 13, the pupil image 164 is flattened as shown in FIG. 12B. When an observation target directly faces the monitor 170 (a front direction D1), the monitor 170 appears perfectly circular, but the pupil image 164 is considerably flattened so as to be horizontally long. When there is an observation target in a left direction D2 of the monitor 170, the observation target sees the monitor 170 obliquely, because of which the monitor 170 appears in a form flattened so as to be vertically long. The vertically long flattening of the monitor 170 and the horizontally long flattening of the pupil image 164 are canceled out, and the pupil image 164 appears in a horizontally long flattened form that is almost perfectly circular. When an observation target is positioned further to the left in a left direction D3, the monitor 170 appears flattened so as to be vertically longer still, and the pupil image 164 appears in a perfectly circular form. When the pupil image 164 of a horizontally long elliptical form is seen from an oblique direction in this way, the pupil image 164 appears perfectly circular to the observation target.

Provided that the flat monitor 170 does not move, the normal direction of the monitor 170 does not change, because of which the sight line direction of the robot 100 cannot actually be changed. In the embodiment, the pupil image 164 of a perfectly circular form is shown to an observation target, even when the monitor 170 is seen from an oblique direction, by causing the pupil image 164 to be transformed. By causing the pupil image 164 to be flattened so as to be horizontally long, the pupil image 164 can be shown as a simulated perfect circle to an observation target who does not directly face the monitor 170. According to this kind of control method, an observation target on the left side of the robot 100 can sense that he or she is being stared at not only by the left eye, but also by the right eye. According to the pupil flattening process, a "sidelong stare" can be expressed even though the monitor 170 is flat and motionless. However, when the pupil flattening process is executed in response to an observation target in the left direction D3, the flattened pupil image 164 is visible to another user in the front direction D1.

In the embodiment, two patterns, those being the perfectly circular pupil image 164 and the flattened pupil image 164, are prepared. The eye control unit 152 switches between the two kinds of pupil image 164 by changing the eyeball texture. Not being limited to two patterns, multiple kinds of eyeball texture may be prepared in accordance with a degree of flatness. As the eye control unit 152 needs only to affix a different eyeball texture, the eye control unit 152 can change the degree of flatness of the pupil image 164 easily and quickly.

When an observation target is in front of the robot 100 (refer to the target direction DF of FIG. 10), the eye control unit 152 causes both the pupil image 164 of the right eye and the pupil image 164 of the left eye to be flattened. When an observation target is on the left side of the robot 100 (refer to the target direction DL of FIG. 10), the eye control unit 152 causes the pupil image 164 of the right eye to be flattened, but does not cause the pupil image 164 of the left eye to be flattened. When an observation target is on the right side of the robot 100 (refer to the target direction DR of FIG. 10), the eye control unit 152 causes the pupil image 164 of the left eye to be flattened, but does not cause the pupil image 164 of the right eye to be flattened.

When detecting a hug by a user, the robot 100 identifies the user performing the hug as an observation target. When the robot 100 is hugged, the eye control unit 152 causes one or both of the pupil images 164 to be flattened in accordance with a relative position of the robot 100 and the observation target. A "relative position" identified by the relative position identifying unit 182 may be the target direction, or may be defined based on both the target direction and the target distance.

When not being hugged, the robot 100 films the periphery using the camera 144, and the recognizing unit 156 recognizes a user using image processing. When there is only one user, the recognizing unit 156 identifies that one user as an observation target. The eye control unit 132 causes the pupil image 164 (pupil region) to change in accordance with a relative position of the robot 100 and the observation target. The relative position identifying unit 182 identifies the target direction by recognizing the user's face from an image filmed by the camera 144. When there are two or more users, the recognizing unit 156 selects any one user as an observation target. The observation target may be the user with the shortest target distance, or may be the user with the highest familiarity.

Figure 14:
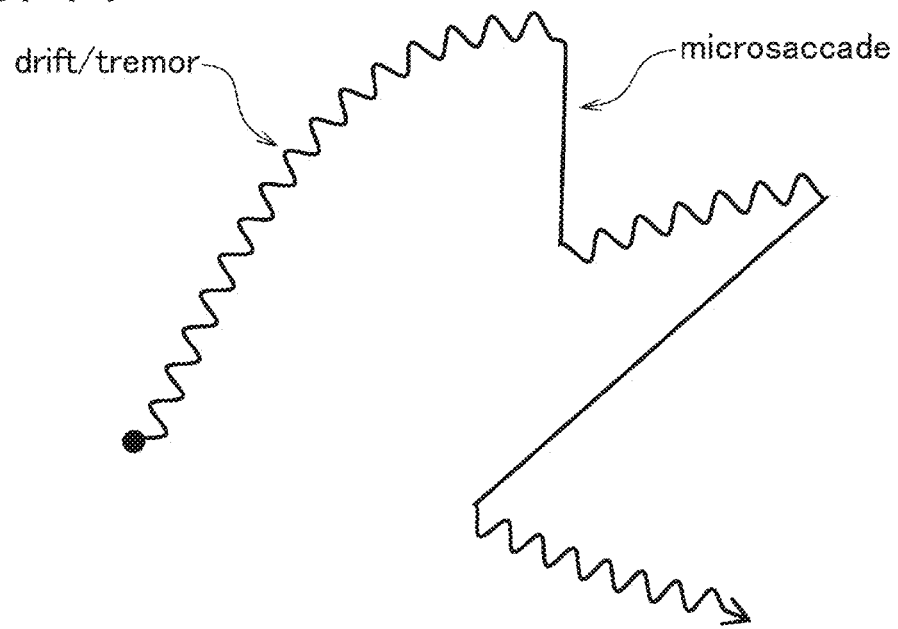
FIG. 14 is a schematic view for describing an involuntary eye movement.

FIG. 14 is a schematic view for describing an involuntary eye movement.

A human pupil is constantly moving slightly in order to prevent light taken in through the eye from burning the retina, and to prevent fatigue of the optical nerve. This is called "involuntary eye movement". Involuntary eye movement is broken down into movements called drift, tremor, and microsaccade. Drift is a wave form movement of a central point of the pupil, tremor is a zigzag movement superimposed on drift, and a microsaccade represents a linear movement of the pupil. It is also said that involuntary eye movement represents a human's psychological state.

The eye image 174 of the robot 100 in the embodiment simulates the involuntary eye movement. Specifically, the eye control unit 152 represents tremor and drift by causing an axial point of the pupil image 164 to move slowly in a wave-form, and at the same time causing the pupil image 164 to vibrate with the axial point as a center. Also, the eye control unit 152 represents a microsaccade by regularly or randomly causing the axial point of the pupil image 164 to move in a jumping fashion. It is sufficient that the axial point is an arbitrary point included in the pupil image 164. In the embodiment, the axial point is the central point of the pupil image 164.

The animal-like aura of the robot 100 can be further heightened by causing the pupil image 164 reflected in the monitor 170 to vibrate, and in particular, by causing the pupil image 164 to perform a movement resembling an involuntary eye movement. The eye control unit 152 causes the pupil image 164 to perform a microsaccade movement at a random timing while causing the pupil image 164 to perform a tremor movement. After the power supply of the robot 100 is turned on, the eye control unit 152 causes the pupil image 164 to continue a tremor movement and a microsaccade movement while constantly causing the pupil image 164 to carry out a drift movement.

Heretofore, the robot 100, and the robot system 300 including the robot 100, have been described based on an embodiment.

According to the control method shown in the embodiment, a user can sense that he or she is being stared at by the robot 100, even when the user is not directly facing the robot 100. Being stared at means sensing that the sight line, or in other words the normal of the pupil in the eyeball, is being directed at oneself. At this time, the pupil staring at oneself is perfectly circular. Although the robot 100 in the embodiment has the three-dimensional eyeball model 250, the robot 100 cannot actually cause the normal of the pupil to move in order to project the eyeball model 250 onto the two-dimensional monitor 170 (eyeball faces 258). In the embodiment, therefore, a user is provided with a sensation of "being stared at" by flattening the pupil image 164, thereby showing the pupil image 164 that is almost perfectly circular to even a user who is not directly facing the monitor 170.

The robot 100 has a round head portion, and causes the eye image 174 to be displayed on two monitors 170 with differing normal directions. Essentially, the pupil images 164 of the left and right eyes are directed in different directions (the right eye normal NR and the left eye normal NL of FIG. 10). The inventors have noticed that a user is unlikely to sense that he or she is being stared at by the robot. 100 when facing the robot 100, and have analyzed the cause thereof. In the embodiment, the pupil flattening process is implemented in accordance with a relative position of a user (observation target) and the robot 100, whereby the perfectly circular pupil image 164 is shown to the user. According to the pupil flattening process, a simulated sight line direction can be set, without being fixed to the normal direction of the monitor 170.

In the embodiment, the eye control unit 152 generates the three-dimensional eyeball model 250, and projects the eyeball model 250 onto the first face 252, thereby generating the two-dimensional eye image 174. Movement or an involuntary eye movement of the pupil image 164 can be expressed by causing the eyeball model 250 to rotate. Furthermore, the eye control unit 152 displays the second face 254, onto which the eyelid image 176 is projected, superimposed on the first face 252. As the eyelid image 176 can be controlled independently of the eyeball model 250 (eyeball projection image 256), the eye control unit 152 can cause the eyelid image 176 to change swiftly.

The eye control unit 152 causes the pupil image 164 to move slightly using a movement that imitates an involuntary eye movement. When a user stares at the eye image 174 of the robot 100 from a short distance too, the user is still more likely to sense that he or she is "being stared at" owing not only to the sight line, but also to the involuntary eye movement. Also, owing to an expression of an involuntary eye movement, a user more easily perceives the existence of the robot 100 as a living being.

The invention not being limited to the heretofore described embodiment or a modified example, components can be changed or embodied without departing from the scope of the invention. Various invent ions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

An action control program of the robot 100 may be provided from a predetermined server via the Internet, or may be provided by a fixed recording medium such as a CD-ROM. In either case, the action control program of the robot 100 may be installed in the robot 100 by being provided from a recording medium (a server, a CD-ROM, or the like) differing from the robot 100.

Modifications

In the embodiment, the robot 100 has been described as having two eyes 110, but the invention is also applicable to a robot having three or more eyes 110, or to a robot having only one eye 110.

A description has been giving assuming that the robot 100 in the embodiment is such that the normal directions (monitor 170 orientations) or the two eyes 110 differ, but the invention is also applicable when the normal directions of the two or more eyes 110 are the same. For example, a robot having a flat face, wherein two eyes 110 are installed in the flat face, is envisaged. When there is an observation target directly in front of the robot, the pupil flattening process is unnecessary. When an observation target exists obliquely in front of the robot, it is sufficient that both of the pupil images 164 are flattened in a relative position of the observation target and the robot 100.

When familiarity with respect to user A is higher than familiarity with respect to user B when user A hands the robot 100 over to user B, the robot 100 may select user A as an observation target. In this case, the robot 100 can perform an emotional expression of appealing with the eyes to user A of a sense of unease at being handed over to user B from the favored user A.

A configuration may be such that the eye control unit 152 does not execute the pupil flattening process, or restricts the degree of flatness, when a multiple of users are detected in the periphery of the robot 100. When user A is the observation target, the robot 100 flattens the pupil image 164 so that the perfectly circular pupil image 164 is visible to user A. In this case, the flattened pupil image 164 is visible to user B (a user who is not the observation target) positioned in a direction differing from that of user A. When a multiple of users exist, or when a multiple of users exist in directions differing by a predetermined angle or greater as seen from the robot 100, the eye control unit 152 may stop or restrict the flattening of the pupil image 164.

A configuration may be such that the eye control unit 152 executes the pupil flattening process only when an observation target is within a predetermined range (hereafter called a "pupil control range") from the robot 100, for example, when an observation target exists within three meters from the robot 100, and within a range of 150 degrees in front of the robot 100. When the observation target and the robot 100 are distanced from each other, the observation target is unlikely to sense the sight line of the robot 100, and is unlikely to experience a feeling of strangeness accompanying deviation of the sight line direction. Also, when the observation target is behind the robot 100, the observation target cannot see the eye 110 of the robot 100, because of which there is little need to execute the pupil flattening process.

A configuration may be such that the eye control unit 152 does not execute the pupil flattening process, or restricts the pupil flattening process, when a multiple of users exist within the pupil control range. This is because when a multiple of users are in the pupil control range, the flattened pupil image 164 is visually recognized by another user when the pupil flattening process is executed with respect to one user. Meanwhile, when there is only one user within the pupil control range even when a multiple of users exist, the eye control unit 152 may execute the pupil flattening process with the one user as a target.

The eye control unit 152 may cause the pupil image 164 to expand or contract. The eye control unit 152 may cause the pupillary region 158 to expand or contract while maintaining the size of the peripheral edge image 168, or may cause the iris region 162 itself to expand or contract. The eye control unit 152 causes the pupil image 164 to expand or contract with a predetermined event (hereafter called an expansion/contraction event) occurring as a trigger. When a large sound or a person is detected, the eye control unit 152 may express surprise or interest of the robot 100 by causing the pupil image 164 to expand. The eye control unit 152 may cause the pupil image 164 to expand when a user with familiarity of a predetermined threshold or greater is detected, or when a user's sight line is detected.

The recognizing unit 156 may detect the brightness of the external environment using a photosensor or the like. The eye control unit 152 may cause the pupil image 164 to contract when the brightness of the external environment is of a predetermined value or greater, and cause the pupil image 164 to expand when the brightness is of a predetermined value or less. In this way, it is sufficient that an expansion/contraction event is defined as an event indicating a change in the external environment, also including interest or surprise.

The eye control unit 152 may carry out a predetermined effect display in the eye image 174 when a predetermined event (hereafter called an "effect event") occurs. When a sight line directed toward the robot 100 from a user existing within a predetermined range is detected, the eye control unit 152 may execute a wink at a predetermined probability. Specifically, the eye control unit 152 may express a wink by causing the eyelid image 116 to momentarily close and open again. In addition to a wink, effect displays such as averting the eyes or causing the eyes to cloud over are conceivable. For example, when a user with familiarity of a predetermined value or lower (a disliked user) is detected, the eye control unit 152 may cause the pupil image 164 to move so that the sight line is not directed toward the user. In other words, the eye control unit 152 may exclude a "disliked user" as an observation target. The eye control unit 152 may set a stare time to be longer the higher the familiarity of a user. When the robot 100 is spoken to by a user, the eye control unit 152 may cause the pupil image 164 to expand, or may indicate "interest" by carrying out a moist eye display such that the eyes appear to be teary. Increasing the size of the catch light 166 reflected in the pupil image 164, causing the catch light. 166 to sway around, changing the quantity, the form, or the position of the catch light 166, expanding the pupil image 164 or the pupillary region 158, causing the pupil image 164 to vibrate, or the like, are conceivable as a specific misty eye display method.

The monitor 170 in the embodiment has been described as being a flat display formed of an organic EL element. As a surface of an organic EL element can be curved, it is thought that a still more natural sight line control could be carried out if the surface of the monitor 170 itself could be curved. Also, although the monitor 170 in the embodiment is fixed to the body 104, a configuration wherein the monitor 170 can move on the body 104 may be adopted. It is thought that a still more natural sight line change can be expressed by the monitor 170 being movable and the surface thereof being curved. Even when there is a limit to the curvature or movability of the monitor 170, a natural sight line expression can be carried out by using the curvature and movability together with the pupil flattening process shown in the embodiment.

Figure 15:
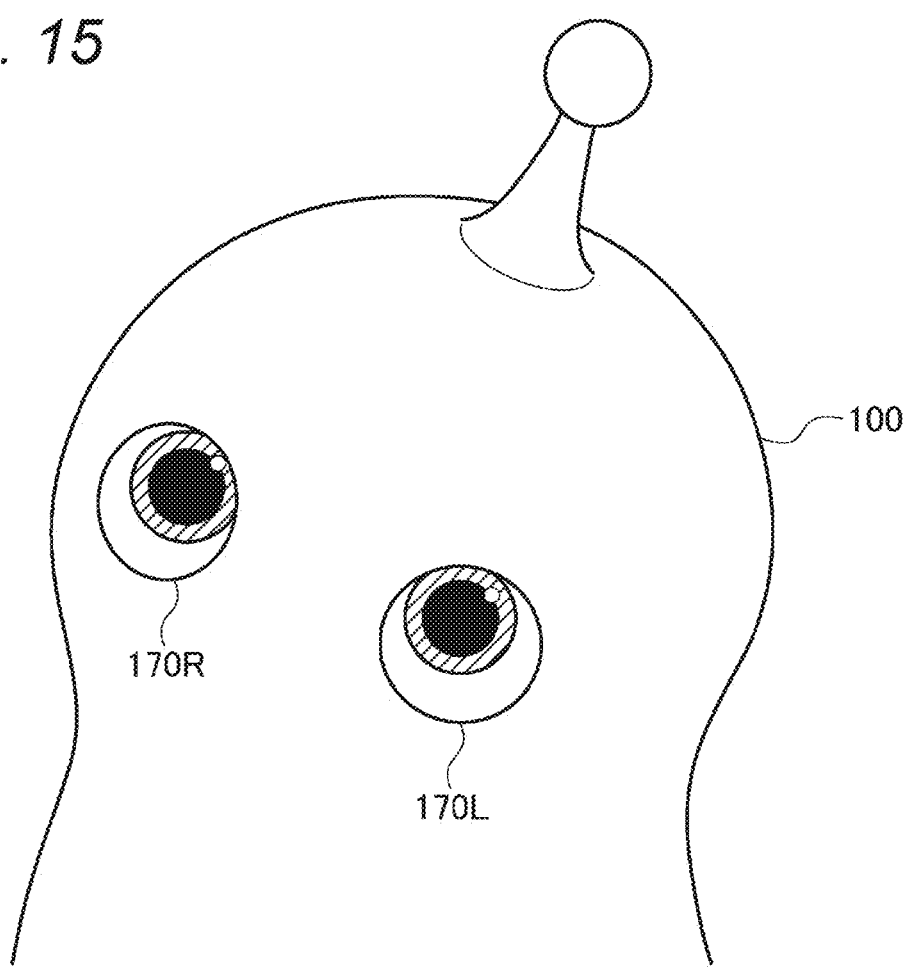
FIG. 15 is an external view of the robot when an observation target is positioned above the robot.

In the embodiment, it has been described that the eye control unit 152 causes the pupil image 164 to be flattened in a horizontal direction. The eye control unit 152 may also cause the pupil image 164 to be transformed in an arbitrary direction in accordance with the target direction. When the face of an observation target is positioned above the robot 100, the eye control unit 152 may cause the pupil image 164 to be flattened in a vertical direction, as shown in FIG. 15. Not being limited to a vertical direction or a horizontal direction, the pupil image 164 may be transformed in an oblique direction in accordance with a target direction. When the robot 100 is being hugged by an observation target, the relative position identifying unit 182 detects an inclination of the hug using a gyro sensor, a touch sensor, a filmed image, or the like, and identifies a relative positional relationship between the robot 100 and the observation target based on the inclination of the robot 100 and the position of the face of the observation target. Based on the relative position, the eye control unit 152 selects a flattening direction of the iris region 162 when carrying out the pupil flattening process. According to this kind of control method, the robot 100 can express an aspect of staring at an observation target with upturned eyes, even when the robot 100 is looked down on from above. The principle is the same as for a horizontal direction flattening. When a small animal looks up with upturned eyes, an observation target is likely to feel the cuteness of the small animal. The robot 100 can also express the same kind of upturned eyes as this kind of small animal by the pupil flattening process being carried out in a vertical direction on the pupil image 164.

In the embodiment, it has been described that the eye control unit 152 causes the pupil image 164 to change in two stages by changing between affixing the eyeball texture of the perfectly circular pupil image 164 and affixing the eyeball texture of the flat pupil image 164. The eye control unit 152 may also cause the pupil image 164 to change in three or more stages. Also, not being limited to changing the texture, the eye control unit 152 may cause the degree of flatness of the pupil image 164 to change continuously. For example, the eye control unit 152 may express continuous flatness of the pupil image 164 by continuously causing the pupil image 164 in the eyeball texture affixed to the eyeball model 250 to be flattened. The eye control unit 152 may set the degree of flatness of the pupil image 164 to be greater the greater an angle formed by the normal direction of the monitor 170 and a target direction.

An upper limit may be set for the degree of flatness of the pupil image 164. By restricting excessive flatness, visual recognition of the pupil image 164 in an unnatural form by a user other than the observation target can be restricted. Also, when the degree of flatness of the pupil image 164 is equal to or greater than a first threshold, the recognizing unit 156 may cause the head portion frame 316 to turn in the direction of the observation target. By causing the head portion frame 316 to move a little, staring at the observation target can be expressed without excessively increasing the degree of flatness of the pupil image 164. In the same way, when the degree of flatness is equal to or greater than a second threshold greater than the first threshold, the recognizing unit 156 may cause the trunk portion frame 318 (the whole body) to turn toward the observation target.

The eye control unit 152 may select any of multiple kinds of the eyeball model 250 (eye image 174). For example, the eye control unit 152 may select an eyeball texture set to be affixed to the eyeball model 250 from a multiple of eyeball texture sets. A multiple of eyeball texture sets (eye images 174) with differing pupil colors may be prepared. Alternatively, an eyeball texture set with a pupils like those in a comic and an eyeball texture set with pupils like those in a photograph may be prepared. Preparing multiple kinds of eyeball texture set in advance, and selecting an eyeball texture set that is to be a control target from the multiple kinds of eyeball texture set, is called a "first selection". A multiple of eyeball textures are correlated in an eyeball texture set accordance with a degree of flatness. Selecting an eyeball texture included in an eyeball texture set in accordance with a degree of flatness is called a "second selection". For example, when an eyeball texture set of blue eyes is selected as the first selection, the eye control unit 152 selects as the second selection, in accordance with the degree of flatness, one of a multiple of blue eye eyeball textures included in the eyeball texture set selected as the first selection. Also, the eye control unit 152 may select one of multiple kinds of eyeball texture as the first selection, and cause the degree of flatness of the pupil image 164 to change in the eyeball texture selected as the first selection.

A user may switch the eyeball model 250 by issuing a selection instruction to the eye control unit 152. The user may input an eyeball texture set selection instruction orally, or an unshown selection button may be provided on the robot 100. The eyeball model 250 (eyeball texture set) may be selected in accordance with a region. For example, the blue eye eyeball model 250 (eyeball texture set) may be set for the robot 100 shipped to North America, and the dark brown eye eyeball model 250 may be set for the robot 100 shipped to an Asian region. The eye control unit 152 may determine a location of the robot 100 using a GPS (global positioning system), and change the eyeball model 250 in accordance with the location. The eye control unit 152 may select as the first selection an eyeball texture set near to the color of the pupils of the first owner seen after the power supply is turned on.

The eye control unit 152 may cause the luminance of the two monitors 170 to change individually. Generally, the monitor 170 appears bright when directly facing the monitor 170, but the monitor 170 appears dark when seen from an oblique direction. The right eye monitor 170R, wherein deviation between the normal direction and the target direction (sight line direction) is greater than in the left eye monitor 170L, as in FIG. 11, appears darker than the left eye monitor 170L. In this case, the eye control unit 152 can increase the visibility of the pupil image 164 in the right eye monitor 170R, which is farther from the observation target, by increasing the luminance of the right eye monitor 170R more than that of the left eye monitor 170L. That is, a balance between the left and right eyes 170 can be achieved in terms of brightness. It is sufficient that the eye control unit 152 sets the luminance of the monitor 170 to be higher the greater the deviation between the normal direction of the monitor 170 and the target direction. Alternatively, the eye control unit 152 may set the luminance of the monitor 170 to be higher the greater the degree of flatness of the pupil image 164.

Main functions of the eye control unit 152 are a first function of carrying out a first selection of an eyeball texture set, a second function of carrying out a second selection, in accordance with a degree of flatness, of an eyeball texture included in the eyeball texture set selected as the first selection, a third function of causing the eyeball model 250 to which an eyeball texture is affixed to move three-dimensionally, and projecting the eyeball model 250 onto the first face 252, and a fourth function of causing the eyelid image 176 to be displayed. The eye control unit 152 may include a "first eye control unit", a "second eye control unit", a "third eye control unit", and a "fourth eye control unit", which manage the first to fourth functions respectively.

In the embodiment, a description has been given with the pupil flattening process as a precondition, but various kinds of modification wherein the pupil flattening process is not executed can also be envisaged.

Gaze Point S

Figure 16:
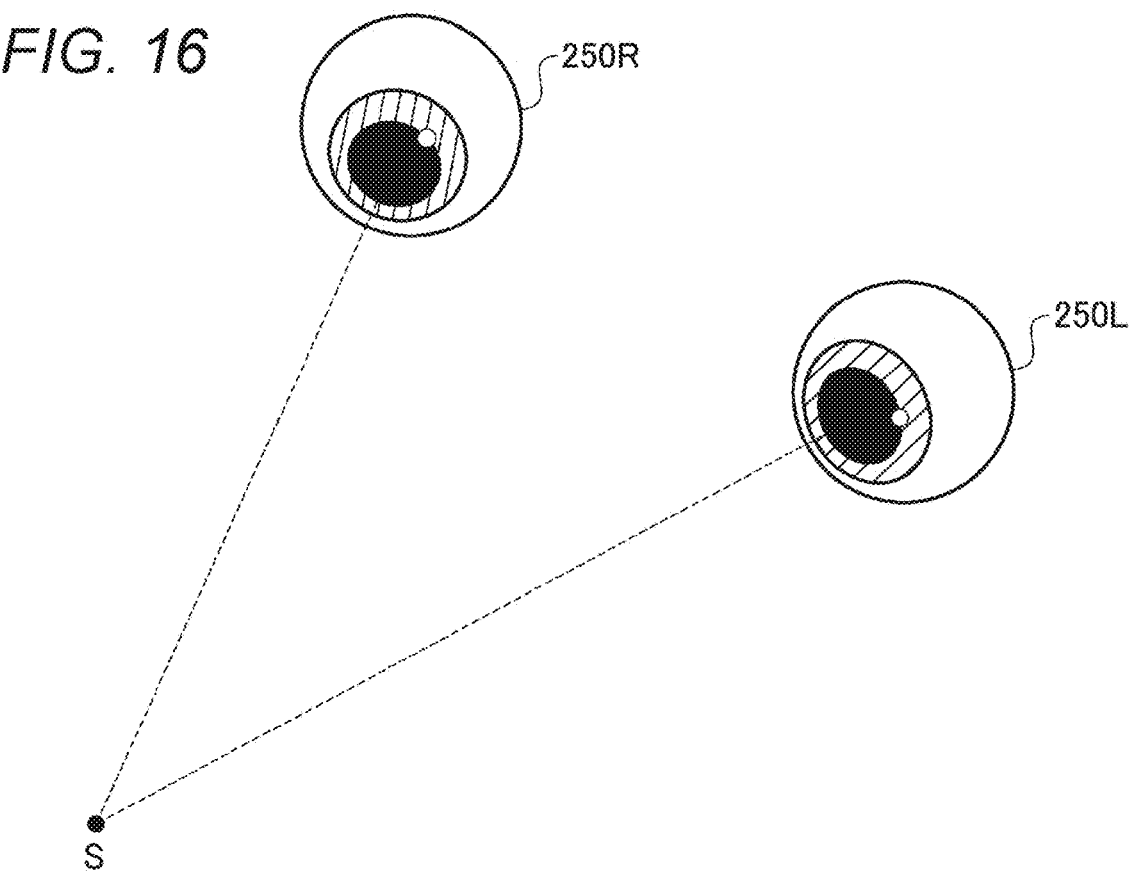
FIG. 16 is a schematic view for describing a gaze point.

FIG. 16 is a schematic view for describing a gaze point S.

The eye control unit 152 may set the gaze point S at an arbitrary point within a space in which the robot 100 exists. The eye control unit 152 causes the eyeball model 250R (right eye) and the eyeball model 250L (left eye) to rotate, directing the two pupil images 164 toward the gaze point S. In other words, the eye control unit 152 causes the gaze point S to be positioned on the normal of the pupil image 164 in the eyeball model 250. By causing the two sight lines from the two pupil images 164 of the robot 100 to be concentrated on the gaze point S, a "focusing" by the robot 100 on the gaze point S can be expressed.

The camera 144, the left eye monitor 170L, and the right eye monitor 170R are provided in the head portion frame 316 of the robot 100, and relative positional relationships thereof are fixed. Firstly, a three-dimensional coordinate system (hereafter called a "sight line coordinate system") having the face (a predetermined region of the head portion frame 316) of the robot 100 as an origin is defined. Positional coordinates of the camera 144, the left eye monitor 170L, and the right eye monitor 170R are fixed in the sight line coordinate system. By disposing the gaze point S in the sight line coordinate system, a display position in the monitor 170 of the pupil image 164 for expressing the sight line can be calculated. The eye control unit 152 determines the coordinates of the gaze point S in the sight line coordinate system. A distance from the robot 100 (the left eye monitor 170L and the right eye monitor 170R) to the gaze point S may be measured using a distance sensor such as a depth camera or a stereo camera. When the gaze point S is set in a person's face, distance may be determined based on the size of a face image included in a filmed image. Not being limited to a person's face, the gaze point S may be an object in which the robot 100 has an interest at the time. For example, a target on which the robot 100 is carrying out image recognition may be set as the gaze point S, and the gaze point S switched sequentially in accordance with progress of the image recognition.

When a user is hugging the robot 100, touching the robot 100, or the like, an approximate distance between the user and the robot 100 is decided in accordance with an aspect of the hug, the touch, or the like. The eye control unit 152 may identify what aspect of involvement the robot 100 has with the user, and estimate the distance to the gaze point S in accordance with that aspect. In this way, it is sufficient that the eye control unit 152 calculates a coordinate value in the sight line coordinate system (space) of the gaze point S, and calculates positions of the pupil image 164 so that the gaze point S is positioned on the normals of the left and right eyeball models 250.

It is sufficient that the eye control unit 152 sets a user's face region, or preferably a user's eye, as the gaze point S. By so doing, a focusing (stare) of the robot 100 with respect to the user can be expressed. In addition to this, the eye control unit 152 may set the gaze point S on an object newly discovered by the robot 100 or a user newly visually recognized by the robot 100. When the gaze point S is set on an accessory, a ring for example, worn by a user, interest or curiosity of the robot 100 with respect to the ring can be expressed. The gaze point S may be set on another robot 100. Distraction can be expressed by causing the gaze point S to move with high frequency.

When the sight line detecting unit 140 detects a sight line from a user, the eye control unit 152 may set the gaze point S in a face region or an eye of the user. According to this kind of control method, behavior of staring back at a user when stared at by the user can be expressed, and the user and the robot 100 can make "time for staring at each other".

It is said that a human has a basic instinct of wanting to constantly keep something he or she likes in a field of vision. Provided that the robot 100 stares back at a user when the user stares at the robot 100, the user can feel that "my affection for the robot 100 is being welcomed", and "not only do I like the robot 100, but the robot 100 likes me too". It is thought that "time for staring at each other" is an important factor in strengthening interaction between a user and the robot 100.

Face Recognition by Thermosensor 138

As heretofore described, an action of "staring" means "having an interest in a target". In particular, when two people stare into each other's eyes, the two people have a "feeling of togetherness" or a "feeling of interaction" that cannot be expressed in words. In order for this kind of strong bond to be realized between a user and the robot 100 too, the robot 100 needs to recognize the position of the user's face, particularly the position of the user's eye.

The recognizing unit 156 of the robot 100 recognizes a user's face region from a filmed image (omnidirectional image) acquired using the camera 144. Furthermore, the recognizing unit 156 identifies the position of the user's eye from the face region in the filmed image. Specifically, the recognizing unit 156 (relative position identifying unit 182) identifies the direction in which the user's eye exists, and the distance thereto, seen from the current location of the robot 100. The eye control unit 152 sets the gaze point S in the position of the user's eye.

Meanwhile, it may be difficult for the robot 100 to recognize the position of the user's face when the user 15 hugging the robot 100, particularly when the user is hugging the robot 100 on his or her lap. For example, the filmed image of the user may become dark due to backlight, or the user's face region may appear flattened when seen from the robot 100 because the camera 144 (horn 112) of the robot 100 is positioned directly below the user's face. When an appropriate filmed image cannot be acquired, the recognizing unit 156 identifies the position of the user's face based on a heat distribution image (external air temperature distribution) obtained from the thermosensor 138, rather than on a filmed image.

Although it may be difficult to identify the position of a user's eye from a heat distribution image, the user's face region does at least form a heat source, because of which the user's face region is easily identified with high accuracy, regardless of the positional relationship between the user and the robot 100. The eye control unit 152 sets the gaze point S in the user's face region identified using the heat distribution image. According to this kind of control method, the robot 100 can stare at a user's face without losing sight of the user's face, even when the robot 100 is being hugged.

When the face region is difficult to detect even from a heat distribution image, the operation control unit 150 may acquire a heat distribution image from a different angle by causing the head portion frame 316 to move. Even when being hugged, the robot 100 can more accurately stare at a user's face by moving the head or the trunk to find a position from which the face can be easily detected. From the action of the robot 100 moving the head or the trunk in order to stare at the user, the user can sense a strong interest from the robot 100 toward him or herself. Of course, when an appropriate filmed image is obtained even when the robot 100 is being hugged, a user's face or eye may be identified based on the filmed image.

As heretofore described, a configuration may be such that when being hugged, the robot 100 recognizes a user's face region based on a heat distribution image rather than a filmed image. Alternatively, it is thought that a user is very close to the robot 100 when the robot 100 detects a touch. Because of this, a configuration may be such that the robot 100 also recognizes a user's face region based on a heat distribution image rather than a filmed image when the robot 100 detects a touch. Meanwhile, a configuration may be such that the robot 100 recognizes a user's face region based on a filmed image when the robot 100 is standing upright, or when the robot 100 is not detecting a touch. By utilizing two kinds of image, those being a filmed image (visible light image) and a heat distribution image, the robot 100 more reliably easily recognizes the position of a user's face.

The recognizing unit 156 of the robot 100 may also search for a heat source from a heat distribution image when the robot 100 performs an upright operation. There is a possibility that a face is the heat source. Although a face forms a heat source, a heat source is not limited to being a face. There is a possibility that a household electrical appliance such as a refrigerator also forms a heat source. Therefore, a point at which a heat source exists is identified using the thermosensor 138, and this is taken to be a "face region candidate". When identifying a face region from a filmed image (omnidirectional image), the recognizing unit 156 executes image recognition with priority to points at which face region candidates identified by the thermosensor 138 exist. By narrowing down face region candidate locations in advance using the thermosensor 138, a face recognition process based on a filmed image (omnidirectional image) can be efficiently executed. In this way, the recognizing unit 156 may detect a user's face region or a user's eye based on both a heat distribution image and a filmed image, rather than on one thereof.

Movement of Pupil Image 164

Figure 17:
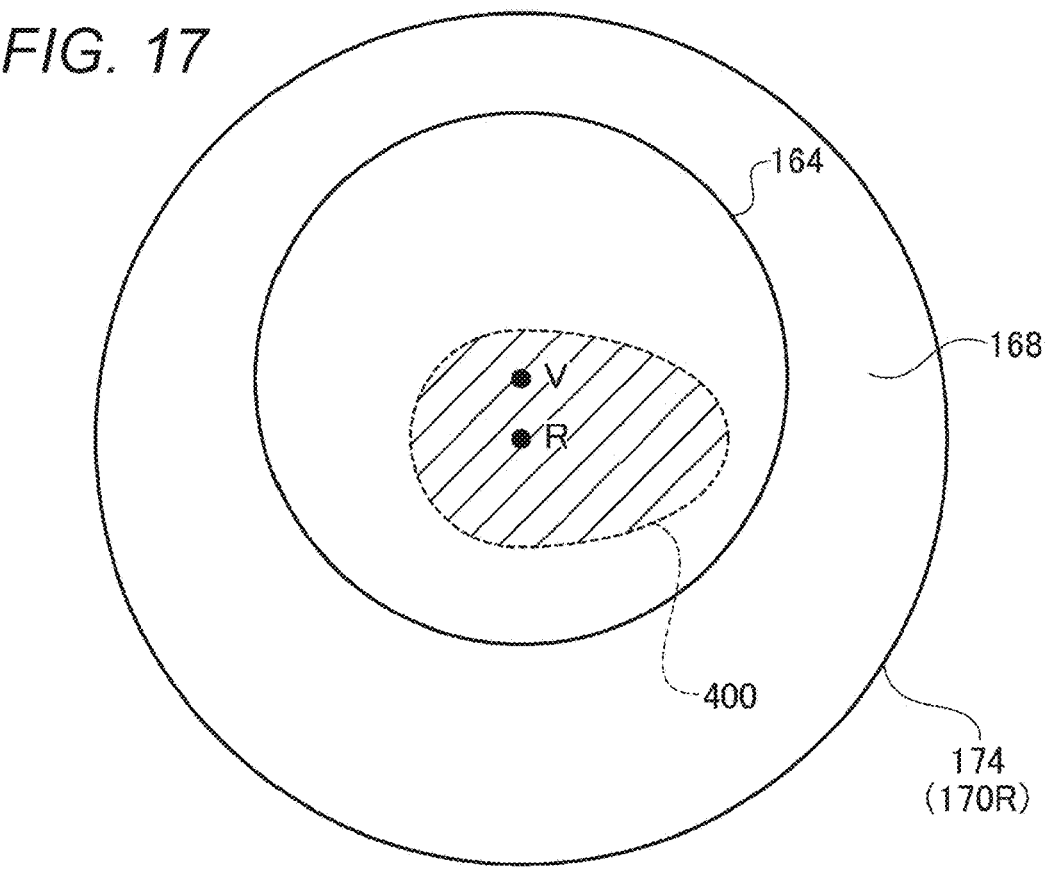
FIG. 17 is a schematic view of the eye image when a pupil image in a right eye monitor is in a central position.

FIG. 17 is a schematic view of the eye image 174 when the pupil image 164 in the right eye monitor 170R is in a central position. FIG. 13 is a schematic view of the eye image 174 when the pupil image 164 in the right eye monitor 170R has deviated from the central position.

When a human is facing directly forward, a pupil is easily moved. However, when looking in a horizontal direction, that is, when in a so-called "sidelong look" state, force is applied to extraocular muscles (a collective name for various kinds of muscle such as the superior rectus muscle) that move the eyeball, because of which it becomes more difficult to move the pupil. For example, force is applied to the extraocular muscles when attempting to look further to the left when already looking to the left, or when causing the sight line to move upward and to the left when looking to the left. In the same way, moving the pupil further upward when having upturned eyes is more difficult than moving the sight line upward when facing directly forward.

Considering these kinds of physical characteristic of the human eyeball, it is thought that the animal-like aura of the robot 100 would be further heightened by carrying out the same kind of control in the eye image 174 of the robot 100. In FIG. 17, a point R indicates a center of the right eye monitor 170R (perfectly circular), and an axial point V indicates a center of the pupil image 164 (perfectly circular). A home region 400 is set in-advance on a peripheral edge of the central point R. A form or the home region 400 is arbitrary. In the right eye monitor 170R shown in FIG. 17, the home region 400 has an ovoid form slightly wider on an inner side (a central side of the face of the robot 100).

Figure 18:
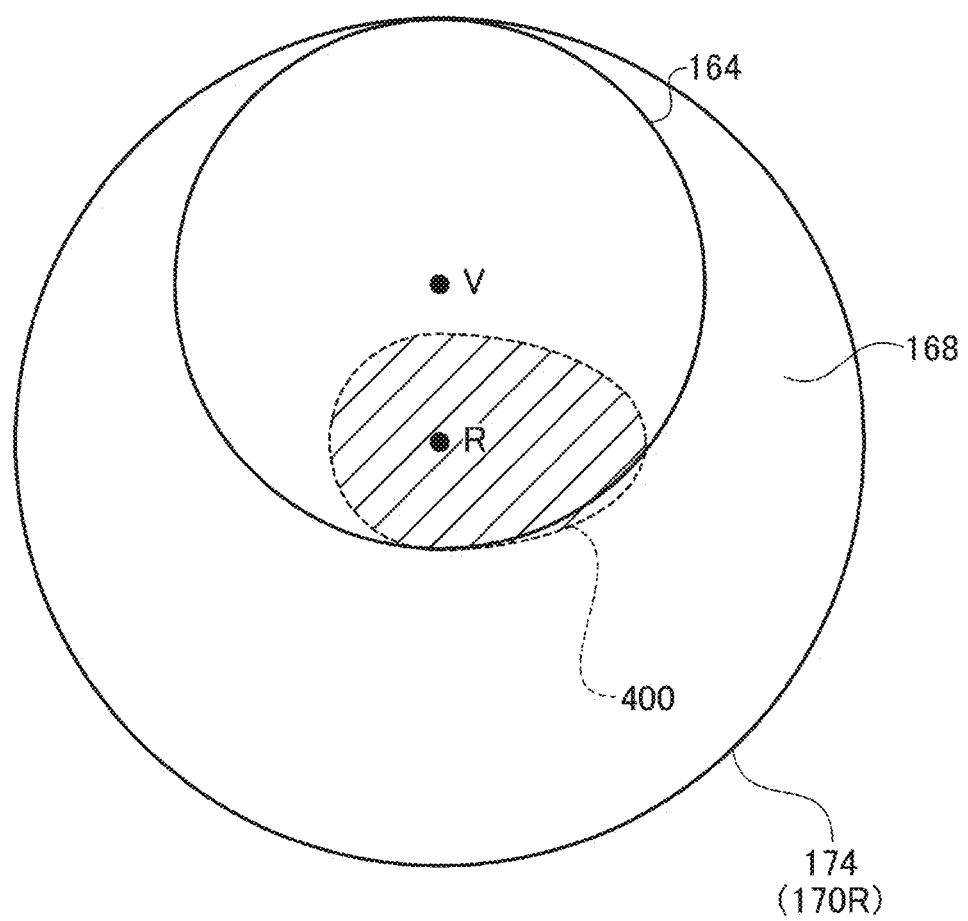
FIG. 18 is a schematic view of the eye image when the pupil image in the right eye monitor has deviated from the central position.

When the axial point V of the pupil image 164 is within the home region 400 (FIG. 17), the eye control unit 152 can cause the pupil image 164 to move at a speed equal to or less than a first upper limit speed T1. Meanwhile, when the axial point V has deviated from the home region 400 (FIG. 18), the eye control unit 152 causes the pupil image 164 to move at a speed (a low speed) equal to or less than a second upper limit speed T2, which is less than the first upper limit speed T1. The pupil image 164 moves briskly in a central portion of the eye image 174, but, moves slowly in a peripheral edge portion. In other words, the sight line moves easily when the robot 100 is facing directly forward, and movement of the sight line becomes sluggish when the robot 100 is looking at the periphery. According to this kind of control method, characteristics of the eye of the robot 100 can be brought still closer to the characteristics of a human eye.

As heretofore described, the eye control unit 152 may set the gaze point S with respect to an arbitrary gaze target object. When a predetermined displacement condition is fulfilled, the operation control unit 150 may direct the face of the robot 100 toward the gaze point S by causing the head or the trunk of the robot 100 to move. Specifically, in a state wherein the axial point V of the pupil image 164 exists within the home region 400 (hereafter called a "central position"), the operation control unit 150 may physically adjust the position of the head or the trunk (the body 104) of the robot 100 so that the pupil image 164 is directed toward the gaze point S.

A displacement condition may be fulfilled when, for example, the robot 100 visually recognizes a user with familiarity of a predetermined threshold or greater (a favored user), or when the robot 100 is hugged by a user. In addition to this, it is sufficient that a displacement condition is arbitrarily set to be when the robot 100 detects a moving object, when the robot 100 detects a flashing object, when the robot 100 detects a predetermined object such as a red piece of clothing, or the like.

The robot 100 directs the sight line toward a user's face when being hugged. When the user's face cannot be gazed at in the central position. (when the robot 100 cannot stare straight ahead at the user), the robot 100 changes the orientation of the body so that the user's face can be gazed at in the central position. When hugging the robot 100, a user can recognize that the robot 100 is moving the body so that the robot 100 is directly facing the user. It is thought that staring at a user after moving not only the pupil image 164 but also, on occasion, the body further arouses a feeling of affection from the user toward the robot 100.

Not being limited to two regions, those being the home region 400 and a region other than the home region 400, three or more regions may be set. Also, a region such as the home region 400 need not be explicitly set. It is sufficient that the eye control unit 152 at least causes the pupil image 164 to move more swiftly the nearer to a central portion of the monitor 170, and causes the pupil image 164 to move more slowly the nearer to a peripheral portion.

Link Between Eyelid Image 176 and Pupil Image 164

Figure 19:
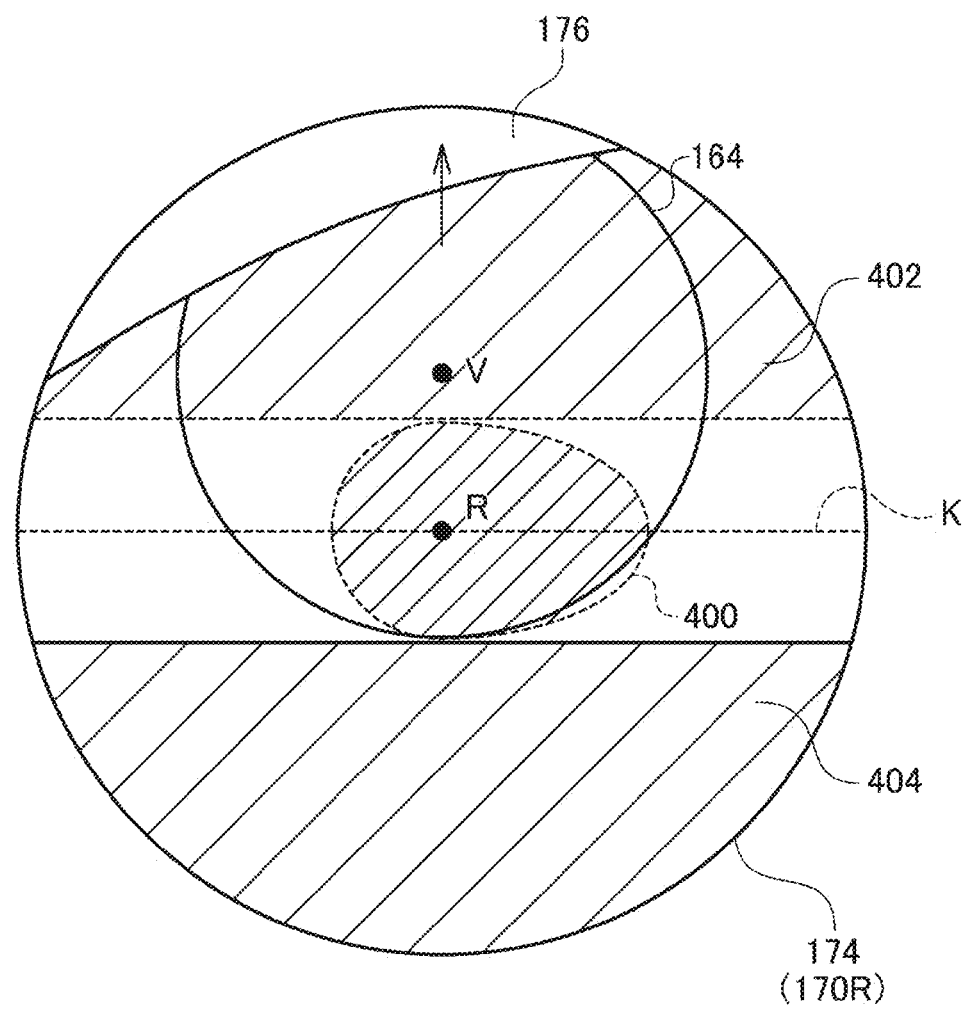
FIG. 19 is a schematic view for describing a link between an eyelid image and the pupil image.

FIG. 19 is a schematic view for describing a link between the eyelid image 176 and the pupil image 164.

When a human looks up by causing the eyeball to rotate, or in other words, when having upturned eyes, the eyelid also moves upward (in an eye opening direction) in conjunction with h the movement of the eyeball. Also, when a human looks down by causing the eyeball to rotate, the eyelid also moves downward (in an eye closing direction) in conjunction. It is thought that physical characteristics of the human eye can be expressed by executing the same kind of control in the robot 100, because of which the animal-like aura of the robot 100 will be further heightened.

In FIG. 19, an upper eye region 402 and a lower eye region 404 are set in advance in the monitor 170. The upper eye region 402 corresponds to the whole of a region above the home region 400, and the lower eye region 404 corresponds to the whole of a region below the home region 400. It is sufficient that the upper eye region 402 is at least set to be above a central line K of the monitor 170. In the same way, it is sufficient that the lower eye region 404 is at least set to be below the central line K.

When the axial point V of the pupil image 164 is within the upper eye region 402 (hereafter called an "upper position"), the eye control unit 152 causes the eyelid image 176 to move upward (in the eye opening direction). Alternatively, when the pupil image 164 moves further upward in the upper position, the eye control unit 152 causes the eyelid image 176 to move upward in conjunction with the pupil image 164. An amount of movement of the pupil image 164 and an amount of movement of the eyelid image 176 do not need to be the same.

In the same way, when the axial point V of the pupil image 164 is within the lower eye region 404 (hereafter called a "lower position"), the eye control unit 152 causes the eyelid image 176 to move downward (in the eye closing direction). Alternatively, when the pupil image 164 moves further downward in the lower position, the eye control unit 152 causes the eyelid image 176 to move downward in conjunction with the pupil image 164.

As the robot 100 in the embodiment is short in comparison with an adult, there are many opportunities to look at a user with upturned eyes. When the robot 100 looks at a nearby user with upturned eyes, the robot. 100 also raises the eyelid image 176 in conjunction, whereby it appears to the user that "the robot 100 is opening its eyes to look at me". Also, when setting the gaze point S on an object on the floor, the robot 100 lowers the sight line. At this time, the eyelid image 176 also descends. By the robot 100 lowering not only the sight line but also the eyelid image 176, it appears to the user that "the robot 100 is concentrating on something". In this way, not only the pupil image 164 of the robot 100, but also the eyelid image 176 can be caused to function effectively for the robot 100 to express focusing or interest.

Contracted Pupil and Dilated Pupil

FIG. 20A to FIG. 20D are schematic views for describing a contracted pupil when an eye is opened. FIG. 21A to FIG. 21D are schematic views for describing a dilated pupil when an eye is opened.

The robot 100 closes the eyes as appropriate by closing the eyelids in order to blink or sleep (charge). In this modification, an opportunity for a user to focus on the pupil image 164 of the robot 100 is actively created by causing the pupillary region 158 to contract or expand when the eye is opened. Hereafter, a state wherein the pupillary region 158 has been caused to contract is called "contracted pupil", and a state wherein the pupillary region 158 has been caused to expand is called "dilated pupil". Hereafter, a description will be given assuming that the state of the pupillary region 158 transitions among three states, those being a "a contracted pupil state (small size)", a "normal state (basic size)", and a "dilated pupil state (large size)".

Figure 20A:
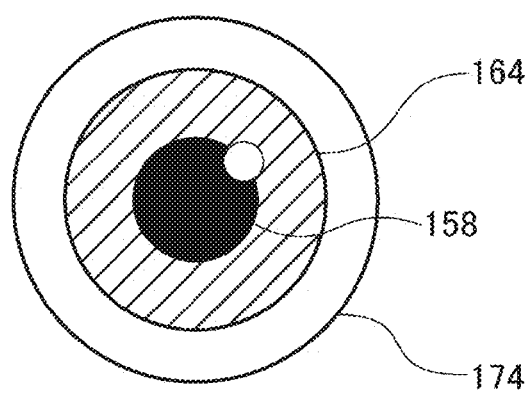
FIG. 20A is a schematic view showing a contracted pupil state before an eye opening.

In a FIG. 20A, the pupillary region 158 is in the contracted pupil state. As heretofore described, the eye control unit 152 may cause the pupillary region 158 to contract when the brightness of the external environment is of a predetermined value or greater, and cause the pupillary region 158 to expand when the brightness is of a predetermined value or less. In FIG. 20A, the periphery of the robot 100 is bright, because of which the pupillary region 158 is contracted. Herein, it is assumed that the robot 100 has closed the eye in order to blink.

Figure 20B:
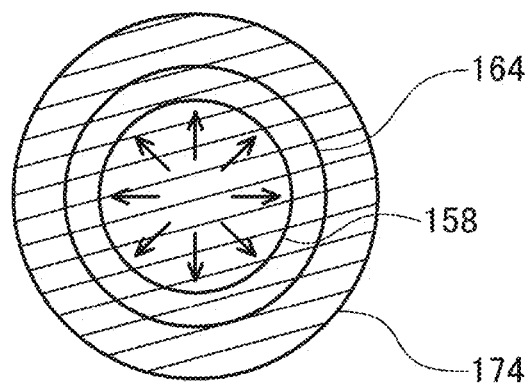
FIG. 20B is a schematic view showing a normal state while an eye is closed.
Figure 20C:
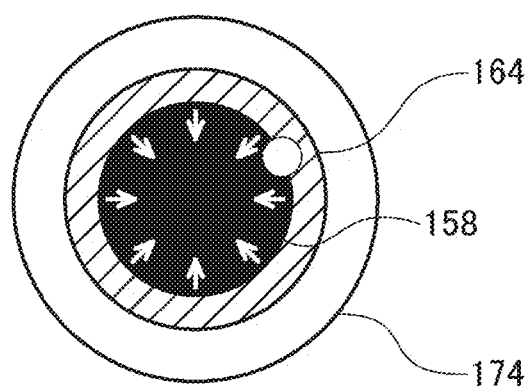
FIG. 20C is a schematic view showing a normal state immediately after an eye is opened.

FIG. 20B snows a state of the pupillary region 158 when the eye is closed. When the eye is closed, the eye control unit 152 causes the pupillary region 158 to change from the contracted pupil state to the normal state (basic size). As the eye is closed, this kind of change of the pupillary region 158 is not visible to a user. Next, it is assumed that the robot 100 has opened the eye. FIG. 20C shows a state of the pupillary region 158 immediately after the eye is opened. The pupillary region 158 immediately after the eye is opened is in the normal state.

Figure 20D:
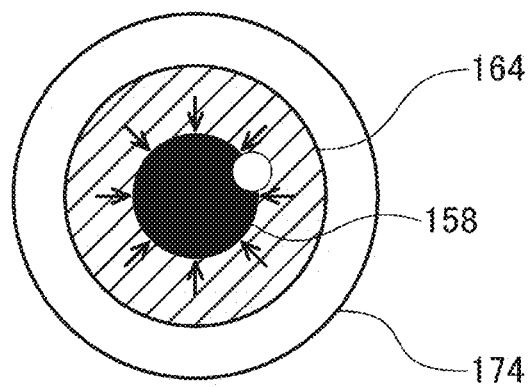
FIG. 20D is a schematic view showing a contracted pupil state after an eye is opened.

After the eye is opened, the eye control unit 152 gradually causes the pupillary region 158 to change from the normal state to the contracted pupil state. The state returns to the original contracted pupil state in a short time of in the region of 0.5 seconds to 3.0 seconds. According to the aforementioned control, the pupillary region 158 of the robot 100 momentarily becomes larger immediately after blinking (FIG. 20C), but subsequently returns to the original size (the contracted pupil state) (FIG. 20D). Immediately after blinking, a user sees an aspect wherein the pupillary region 158 contracts.

Figure 21A:
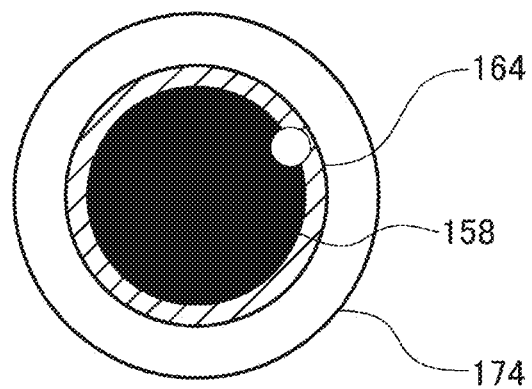
FIG. 21A is a schematic view showing a dilated pupil state before an eye opening.
Figure 21B:
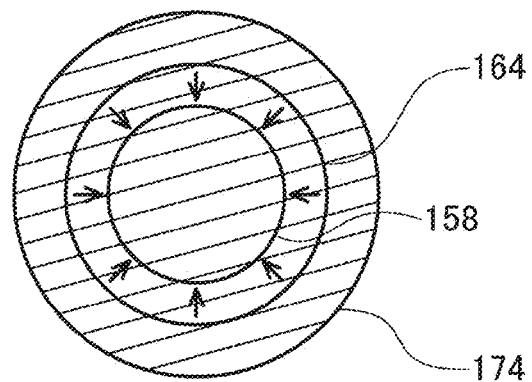
FIG. 21B is a schematic view showing a normal state while an eye is closed.

Meanwhile, in FIG. 21A, the periphery of the robot 100 is dark, because of which the pupillary region 158 is in the dilated pupil state. Herein, it is assumed that the robot 100 has closed the eye in order to blink. FIG. 21B shows a state of the pup nary region 158 when the eye is closed. When the eye is closed, the eye control unit 152 causes the papillary region 158 to change from the dilated pupil state to the normal state (basic size).

Figure 21C:
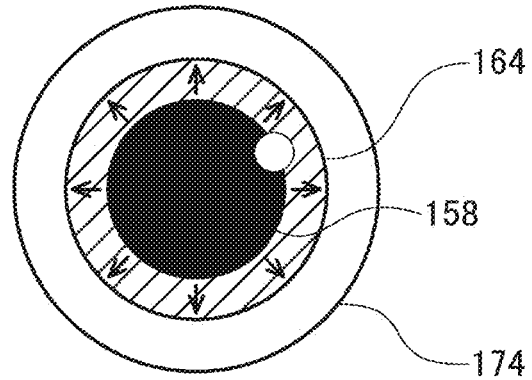
FIG. 21C is a schematic view showing a normal state immediately after an eye is opened.
Figure 21D:
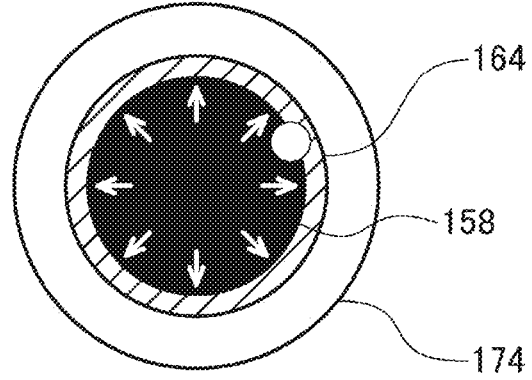
FIG. 21D is a schematic view showing a dilated pupil state after an eye is opened.

Continuing, the robot 100 opens the eye. FIG. 21C shows a state of the pupillary region 158 immediately after the eye is opened. The pupillary region 158 immediately after the eye is opened is temporarily in the normal state. After the eye is opened, the eye control unit 152 gradually causes the papillary region 158 to change from the normal state to the dilated pupil state. According to the aforementioned control, the pupillary region 158 of the robot 100 becomes smaller after blinking (FIG. 21C), but subsequently returns to the original size (the dilated pupil state) (FIG. 21D). Immediately after blinking, a user sees an aspect wherein the pupillary region 158 expands.

As heretofore described, the pupillary region 158 changes from the normal state to the contracted pupil state, or from the normal state to the dilated pupil state, when the robot 100 opens the eye. As a human has a basic instinct of following a moving object with the eyes, an opportunity for a user to focus on the eye of the robot 100 can be created by causing the pupillary region 158 to change.

The pupillary region 158 is caused to change to the normal state when the robot 100 has closed the eye, or in other words, when a user is not looking, and the pupillary region 158 is returned to the original state (the contracted pupil state or the dilated pupil state) after the eye is opened, because of which the user is unlikely to have a feeling of strangeness. For example, in the series of controls shown in FIG. 20A to FIG. 20D, the pupillary region 158 has the contracted pupil state as a base, and it is only immediately after the eye is opened that the state becomes the normal state. When blinking in the contracted pupil state, the pupillary region 158 appears expanded only momentarily, then immediately returns to the contracted pupil state. Owing to the slight image change from the normal state after the eye is opened to the contracted pupil state, a human is more likely to subconsciously focus on the eye image 174 of the robot 100.

The robot 100 focuses on a user with being stared at by the user as a trigger. Consequently, the greater the number of opportunities for a user to stare at the robot 100, the more easily "time for staring at each other" is created. A contracted pupil or a dilated pupil not only heightens the animal-like aura of the robot 100, but is also effective in actively creating an opportunity for a user and the robot 100 to stare at each other.

The robot 100 may measure the brightness of the external environment using an illuminance sensor or the like. Alternatively, the robot 100 may measure the brightness from a filmed image. The eye control unit 152 may cause the pupillary region 158 to contract or expand in accordance with the brightness. For example, when the brightness of the external environment is at a predetermined threshold or greater immediately after the eye opening of FIG. 21C, the eye control unit 152 may cause the pupillary region 158 to change from the normal state to the contracted pupil state.

When a charging rate of the battery 118 has decreased, the operation control unit 150 causes the robot 100 to head toward a charging station (not shown). The robot 100 closes the eyes when connected to the charging station. A charging state may be correlated to a sleeping state by causing the robot 100 to close the eyes during charging. When the charging rate of the battery 118 reaches a predetermined threshold or greater, the operation control unit 150 causes the robot 100 to move away from the charging station. At this time, the eye control unit 152 expresses "waking up" by causing the eye image 174 to open.

The eye control unit 152 may also cause the size of the pupillary region 158 to change when opening the eyes in accompaniment to waking up. The eye control unit 152 may express waking up by causing the eyelid image 176 to move slowly.

The eye control unit 152 may cause the pupillary region 158 to contract or dilate while the robot 100 is moving. Also, the eye control unit 152 may also cause the pupillary region 158 to contract or dilate when the gaze point S of the robot 100 does not change for a predetermined time or longer.

Not being limited to brightness, the eye control unit. 152 may also cause the pupillary region 158 to contract or dilate in accordance with various kinds of expansion/contraction event that occur when the eye is opened. For example, when the robot 100 visually recognizes a user with familiarity of a predetermined threshold or greater when opening the eyes, the eye control unit 152 may express "happy surprise" of the robot 100 by causing the pupillary region 158 to dilate. Alternatively, when the robot 100 visually recognizes a user with familiarity of a predetermined threshold or lower (a disliked user), or when visually recognizing an unregistered user, when opening the eyes, the eye control unit. 152 may cause the pupillary region 158 to contract, or may express "discomfort" by averting the gaze point S from the user. According to this kind of control method, a user can perceive how he or she is thought of by the robot 100.

A user may issue a verbal command such as "close your eyes (an eye closing instruction)" or "open your eyes (an eye opening instruction)" to the robot 100. The robot 100 detects the voice using the microphone array, and the recognizing unit 156 interprets the verbal command. For example, a user causes the robot. 100 to close the eyes, and prepares a present such as a new piece of clothing in front of the eyes of the robot 100. When the robot 100 is caused to open the eyes, the eye control unit 152 causes the pupillary region 158 to dilate in response to the event of detecting "something new". According to this kind of control method, a way of interacting with the robot 100 that involves surprising the robot 100 by showing the robot 100 something new can be adopted.

A configuration may be such that when the eye control unit 152 returns the pupillary region 158 from the contracted pupil state to the normal state in FIG. 20B (eyes closed), the pupillary region 158 is returned from the contracted pupil state to the normal state gradually rather than being returned to the normal state instantly. In this case, the size of the pupillary region 158 immediately after the eye is opened can be caused to change in accordance with a length of time for which the eyes have been closed.

Expression of Emotion by Pupil

The eye control unit 152 may cause the eye image 174 to change in accordance with an emotion parameter. The eye control unit 152 may cause a movement speed or an amount of movement of drift, an amplitude or a frequency of tremor, or a frequency, an amount of movement, or a movement speed of a microsaccade, to change in accordance wish an emotion parameter. The eye control unit 152 may cause the form and the size of the pupillary region 158 to change in accordance with an emotion parameter.

How she eye image 174 is caused to change in accordance with an emotion parameter can be set arbitrarily. For example, when the emotion parameter representing a desire for approval is of a predetermined value or greater, the eye control unit 152 may express unease or agitation of the robot 100 by increasing the frequency of microsaccades. To what extent the frequency of microsaccades is increased when the emotion parameter indicating a desire for approval is high, or whether or not to increase the frequency, may be determined randomly.

Continuation of Stare

The robot 100 sets the gaze point S on a user's face, particularly on an eye. When the robot 100 moves, or when the user moves, the positional relationship between the user and the robot 100 changes. The recognizing unit 156 detects the position of the user's face again when the positional relationship between the user and the robot 100 changes, and the eye control unit 152 resets the gaze point S to the point at which the user's face is detected again. That is, the recognizing unit 156 continuously tracks the gaze point S, and the eye control unit 152 expresses a smooth sight line movement by continuously causing the pupil image 164 to move. According to this kind of control method, the robot 100 can continue to stare at a user even when the positional relationship between the user and the robot 100 changes.

When the positional relationship changes, the eye control unit 152 firstly continues a stare of the robot 100 at the user by causing the pupil image 164 to move. When the pupil image 164 deviates from the central position, the operation control unit 150 maintains the stare by causing the head or the whole body of the robot 100 to move. By the stare of the robot 100 at the user being continued, the user can perceive a strong interest or expectation with respect to him or herself from the robot 100.

Release of Stare

The robot 100 removing the sight line from a user also forms a trigger for the user noticing that he or she has been stared at by the robot 100. The following kinds of condition are conceivable for determining a timing of the robot 100 removing the sight line from a gaze target object (a user or the like).

(C1) When a predetermined time (hereafter called a "first gaze maintaining time") elapses from the robot 100 setting the gaze, point S on a user's face (a gaze target object), the robot 100 removes the sight line from the user by resetting the gaze point S to a point other than the user's face.

(C2) The sight line is not removed when a user is speaking to the robot 100. When a predetermined time (hereafter called a "second gaze maintaining time") elapses from the user finishing speaking to the robot 100, the robot 100 removes the sight line from the user.

(C3) The sight line is not removed when a user is staring at the robot 100. When a predetermined time (hereafter called a "third gaze maintaining time") elapses from the user moving the sight line from the robot 100, the robot 100 removes the sight line from the user.

(C4) The robot 100 removes the sight line from a user when a predetermined event occurs. For example, a loud sound being detected, another user being visually recognized, and the like, are conceivable as events.

(C5) The robot 100 removes the sight line from a user when an emotion parameter reaches a predetermined state. For example, a configuration may be such that the emotion parameter indicating a desire for approval continues to rise when the sight line from a user is being detected, and the robot 100 removes the sight line from the user when the emotion parameter reaches a predetermined threshold or greater.

The heretofore described various kinds of gaze maintaining times may be variable values. The eye control unit 152 may set the gaze maintaining time to be longer the higher the familiarity of a user that is a gaze target object. Alternatively, the eye control unit 152 may determine the length of the gaze maintaining time based on an emotion parameter. For example, the eye control unit 152 may set the gaze maintaining time to be longer the higher the emotion parameter indicating a desire for approval.

A gaze target object, not needing to be a user, may be another robot 100. A multiple of robots 100 can stare at each other.

Formation of Eye Image 174 Using Multiple Images

In the embodiment, a description has been given assuming that the two-dimensional eye image 174 is generated by the eyeball model 250 being projected onto the first face 252. As a modification, the eye image 174 may be formed by stacking a multiple of images.

In the modification, a description will be given assuming that the eye image 174 is generated by stacking five images, those being an eye white image, an iris image, a pupillary image, a highlight image, and a reflection image. Also, the second face 254 (the eyelid image 116) is superimposed on the five images.

(L1) Eye White Image

The eye white image is an image on a lowermost layer, and corresponds to a white portion (the peripheral edge image 168) of the eye image 174. The eye white image is a fixed image that does not follow movement of the sight line.

(L2) Iris Image

The iris image is superimposed on the eye white image. The iris image corresponds to the iris region 162 of the eye image 174. The iris image moves vertically and horizontally in the eye image 174 in accompaniment to movement or the sight line.

(L3) Pupillary Image

The pupillary image is superimposed on the iris image. The pupillary image corresponds to the pupillary region 158 of the eye image 174. The pupillary image moves vertically and horizontally in the eye image 174 in accompaniment to movement of the sight line.

(L4) Highlight Image

The highlight image is supposed on the pupillary image. The highlight image corresponds to the catch light 166 of the eye image 174. The highlight image does not follow movement of the sight line. When the orientation of the robot 100 changes, the eye control unit 152 adjusts the position of the catch light 166 by causing the highlight image to move in accordance with a light incident direction.

(L5) Reflection Image

The reflection image is superimposed on the highlight image. The highlight image is a reflection in the pupil. The eye control unit 152 causes a filmed image from in front of the robot 100 to be transformed as though with a fisheye lens, and superimposes the transformed image on the highlight image. The reflection image does not follow movement of the sight line. When the orientation of the robot 100 changes, the eye control unit 152 causes the reflection image to change in accordance with the filmed image.

To summarize, the eye white image is fixed as a "foundation" of the eye image 174. The pupillary image and the iris image move in accordance with the sight line direction. The highlight image and the reflection image move in accordance with the orientation of the robot 100, regardless of the sight line direction. Also, although the pupillary image and the iris image move in the same direction, amounts of movement thereof need not be the same. This modification is such that when the iris image is caused to move by a first amount of movement in a first direction, the pupillary image is caused to move by a second amount of movement in the first direction. At this time, the second amount of movement is a value greater than the first amount of movement. By creating a slight divergence between pupillary movement and iris movement, an animal-like aura and realism of the eye image 174 can be further heightened.

The invention claimed is:

1. A robot, comprising:
a non-transitory computer readable medium configured to store instructions;
a display;
a sensor configured to detect a location of a user; and
a processor connected to the display and the non-transitory computer readable medium, wherein the processor is configured to execute the instructions for:
generating an eye image, wherein the eye image includes a pupil region;
instructing the display to display the eye image, and
changing the pupil region in accordance with the detected location of the user, and
causing the pupil region to vibrate in the eye image.

2. The robot according to claim 1, wherein the processor is configured to execute the instructions for changing the pupil region in response to the detected location of the user being within a predetermined range from the robot.

3. A robot, comprising:
a non-transitory computer readable medium configured to store instructions;
a display;
a sensor configured to detect a location of a user; and
a processor connected to the display and the non-transitory computer readable medium, wherein the processor is configured to execute the instructions for:
generating an eye image, wherein the eye image includes a pupil region;
instructing the display to display the eye image, and
changing the pupil region in accordance with the detected location of the user,
generating an eyeball model, the eyeball model is a three-dimensional model of an eyeball, and the display is configured to project the eyeball model onto a first face virtual plane,
generating an eyelid image, and
instructing the display to display the eyelid image on a second face virtual plane, different from the first face virtual plane, wherein the eyelid image is superimposed on the eye image projected onto the first face virtual plane.

4. The robot according to claim 1, wherein the processor is configured to execute the instructions for causing the pupil region to vibrate with an axial point as a center, while causing the axial point to move in the eye image.

5. The robot according to claim 1, wherein the processor is configured to execute the instructions for causing the pupil region to expand or contract.

6. The robot according to claim 1, wherein the sensor is configured to detects a sight line of the user, and
the processor is configured to execute the instructions for changing the eye image in response to the detected sight line of the user being toward the robot.

7. A robot, comprising:
a non-transitory computer readable medium configured to store instructions;
a display;
a sensor configured to detect a location of a user; and
a processor connected to the display and the non-transitory computer readable medium, wherein the processor is configured to execute the instructions for:
generating an eye image, wherein the eye image includes a pupil region;
instructing the display to display the eye image, and
changing the pupil region in accordance with the detected location of the user, wherein display comprises a first display device and a second display device,
the processor is configured to execute the instructions for instructing the display to display the eye image on each of the first display device and the second display device, the first display device is closer to the detected location of the user than the second display device, and
the processor is configured to execute the instructions for changing the pupil region of the eye image on the first display device to a greater degree than the pupil region of the eye image on the second display device.

8. A robot, comprising:
a non-transitory computer readable medium configured to store instructions;
a display;
a sensor configured to detect a location of a user; and
a processor connected to the display and the non-transitory computer readable medium, wherein the processor is configured to execute the instructions for:
generating an eye image, wherein the eye image includes a pupil region;
instructing the display to display the eye image, and
changing the pupil region in accordance with the detected location of the user;
a drive mechanism for executing a motion of the robot selected by the operation control unit, wherein
the processor is configured to execute the instructions for selecting the motion of directing a predetermined region of a head portion or a trunk portion of the robot toward the detected location of the user in response to an amount of change of the pupil region being greater than or equal to a predetermined value.

9. The robot according to claim 8, wherein the display device is in the head portion of the robot.

10. The robot according to claim 8, wherein the head portion is coupled to the trunk portion, and
the processor is configured to execute the instructions for selecting the motion of the trunk portion so that the display device faces the detected location of the user.

11. The robot according to claim 8, wherein the processor is configured to execute the instructions for avoiding selection of the motion of directing the display device or the trunk portion of the robot toward the detected location of the user in response to the amount of change of the pupil region being less than the predetermined value.

12. A robot, comprising:
a non-transitory computer readable medium configured to store instructions;
a display;
a sensor configured to detect a location of a user; and
a processor connected to the display and the non-transitory computer readable medium, wherein the processor is configured to execute the instructions for:
generating an eye image, wherein the eye image includes a pupil region;
instructing the display to display the eye image, and
changing the pupil region in accordance with the detected location of the user, wherein the processor is configured to execute the instructions for selecting the eye image from multiple kinds of eye images as a control target, and changing the pupil region based on the selected eye image.

13. A robot, comprising:
a non-transitory computer readable medium configured to store instructions;
a display;
a sensor configured to detect a location of a user; and
a processor connected to the display and the non-transitory computer readable medium, wherein the processor is configured to execute the instructions for:
generating an eye image, wherein the eye image includes a pupil region;
instructing the display to display the eye image, and
changing the pupil region in accordance with the detected location of the user, wherein the processor is configured to execute the instructions for:
setting an eye of the user as a gaze point,
changing the eye image to direct a perceived sight line of the robot toward the gaze point, and
changing the perceived sight line of the robot to remain directed toward the eye of the user based on detected changes in the location of the user.

14. The robot according to claim 6, wherein processor is configured to execute the instructions for:
setting an eye of the user as a gaze point,
changing the eye image to direct a perceived sight line of the robot toward the gaze point, and
changing the gaze point from the eye of the user in response to detected that a sight line of the user is directed away from the robot.

15. A non-transitory computer readable medium for storing instructions that when executed by a processor cause a robot to:
display an eye image on a display device in the robot, wherein the eye image comprises a pupil region;
detect a location of a user;
change the pupil region in accordance with a relative position of the detected location of the user and the robot;
generate an eyeball model, the eyeball model is a three-dimensional model of an eyeball, and the display is configured to project the eyeball model onto a first face virtual plane,
generate an eyelid image, and
instruct the display device to display the eyelid image on a second face virtual plane, different from the first face virtual plane, wherein the eyelid image is superimposed on the eye image projected onto the first face virtual plane.

16. A robot, comprising:
a camera;
a temperature sensor;
a display;
a non-transitory computer readable medium configured to store instructions; and
a processor connected to the camera, the temperature sensor, the display and the non-transitory computer readable medium, wherein the processor is configured to execute the instructions for:
generating an eye image, wherein the eye image comprises a pupil region;
instructing the display to display the eye image,
detecting a user based on first information from the camera or second information from the temperature sensor,
selecting either the first information or the second information based on a positional relationship between the robot and the user,
identifying a face region of the user,
setting the identified face region as a gaze point, and
changing a location of the pupil region in the eye image in accordance with detected changes in the gaze point.

17. The robot according to claim 16, wherein the processor is configured to execute the instructions for causing the pupil region to vibrate in the eye image.

18. The robot according to claim 17, wherein the processor is configured to execute the instructions for causing the pupil region to vibrate with an axial point as a center, while causing the axial point to move in the eye image.

19. A non-transitory computer readable medium for storing instructions that when executed by a processor cause a robot to:
display an eye image on a first display device and a second display device in the robot, wherein the eye image comprises a pupil region;
detect a location of a user;
change the pupil region in accordance with a relative position of the detected location of the user and the robot,
instruct the first display device to display a first eye image and the second display device to display a second eye image, the first display device is closer to the detected location of the user than the second display device, and
change the pupil region of the first eye image on the first display device to a greater degree than the pupil region of the second eye image on the second display device.

20. A non-transitory computer readable medium for storing instructions that when executed by a processor cause a robot to:
display an eye image on a display device in the robot, wherein the eye image comprises a pupil region;
detect a location of a user;
change the pupil region in accordance with a relative position of the detected location of the user and the robot, and
select a motion, for execution by a drive mechanism, of directing a predetermined region of a head portion or a trunk portion of the robot toward the detected location of the user in response to an amount of change of the pupil region being greater than or equal to a predetermined value.

21. A non-transitory computer readable medium for storing instructions that when executed by a processor cause a robot to:
display an eye image on a display device in the robot, wherein the eye image comprises a pupil region;

detect a location of a user;
change the pupil region in accordance with a relative position of the detected location of the user and the robot, and
select the eye image from multiple kinds of eye images as a control target, and change the pupil region based on the selected eye image.

22. A non-transitory computer readable medium for storing instructions that when executed by a processor cause a robot to:
   display an eye image on a display device in the robot, wherein the eye image comprises a pupil region;
   detect a location of a user;
   change the pupil region in accordance with a relative position of the detected location of the user and the robot,
   set an eye of the user as a gaze point,
   change the eye image to direct a perceived sight line of the robot toward the gaze point, and
   change the perceived sight line of the robot to remain directed toward the eye of the user based on detected changes in the location of the user.

23. A non-transitory computer readable medium for storing instructions that when executed by a processor cause a robot to:
   display an eye image on a display device in the robot, wherein the eye image comprises a pupil region;
   detect a location of a user;
   change the pupil region in accordance with a relative position of the detected location of the user and the robot; and
   cause the pupil region to vibrate in the eye image.

* * * * *